(12) United States Patent
Daga et al.

(10) Patent No.: US 11,734,499 B2
(45) Date of Patent: Aug. 22, 2023

(54) SMART CONTENT INDICATOR BASED ON RELEVANCE TO USER

(71) Applicant: Avaya Management L.P., Durham, NC (US)

(72) Inventors: Navin Daga, Silapathar (IN); Sandesh Chopdekar, Pune (IN); Pushkar Yashavant Deole, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/175,237

(22) Filed: Feb. 12, 2021

(65) Prior Publication Data
US 2022/0261534 A1    Aug. 18, 2022

(51) Int. Cl.
| | |
|---|---|
| *G06F 40/00* | (2020.01) |
| *G06F 40/166* | (2020.01) |
| *G06N 20/00* | (2019.01) |
| *H04L 67/306* | (2022.01) |
| *G06F 40/106* | (2020.01) |
| *G06F 16/9535* | (2019.01) |

(52) U.S. Cl.
CPC ........ *G06F 40/166* (2020.01); *G06F 16/9535* (2019.01); *G06F 40/106* (2020.01); *G06N 20/00* (2019.01); *H04L 67/306* (2013.01)

(58) Field of Classification Search
CPC ... G06F 40/166; G06F 40/106; G06F 16/9535
See application file for complete search history.

(56) References Cited

U.S. PATENT DOCUMENTS

| | | | |
|---|---|---|---|
| 7,469,280 B2 | 12/2008 | Simpson | |
| 8,150,798 B2* | 4/2012 | Ma | G06Q 50/184 |
| | | | 705/310 |
| 8,997,304 B2 | 3/2015 | Ramanujam et al. | |
| 9,886,664 B2 | 2/2018 | Dhara et al. | |
| 10,353,994 B2* | 7/2019 | Upadhyay | H04L 51/16 |
| 11,354,500 B2* | 6/2022 | Bhattacharya | G06F 40/205 |

(Continued)

FOREIGN PATENT DOCUMENTS

EP    WO 2007/048432 A1 * 10/2005

OTHER PUBLICATIONS

How to Send an Effective Meeting Recap or Follow Up Email, by Indeed Career Guide, 6 pages, Archive captured Aug. 12, 2020, retrieved from https://web.archive/20200812074934/https://www.indeed.com/career-development-advice/career-development/meeting-recap. (Year: 2020).*

(Continued)

*Primary Examiner* — Scott T Baderman
*Assistant Examiner* — Barbara M Level
(74) *Attorney, Agent, or Firm* — Sheridan Ross P.C.

(57) ABSTRACT

The present disclosure provides, among other things, methods and systems of managing communications, the method including: receiving a first communication; obtaining a user profile; comparing a user property from the user profile with a first content and a second content in the first communication; determining a first relevancy of the first content and a second relevancy of the second content; configuring a first content layout of the first communication based on the first relevancy and the second relevancy; and displaying the first content layout.

20 Claims, 9 Drawing Sheets

(56) References Cited

U.S. PATENT DOCUMENTS

| | | |
|---|---|---|
| 2012/0272160 A1* | 10/2012 | Spivack .................. H04L 51/32 715/752 |
| 2014/0189533 A1 | 7/2014 | Krack et al. |
| 2015/0033141 A1* | 1/2015 | Mishra .................... H04L 51/22 715/752 |
| 2017/0132569 A1* | 5/2017 | Parhi ...................... G06N 20/00 |
| 2017/0161372 A1* | 6/2017 | Fernández ............ G06F 40/211 |
| 2017/0366490 A1* | 12/2017 | Rose ....................... H04L 51/08 |
| 2018/0077103 A1* | 3/2018 | Soni ........................ H04L 67/10 |
| 2018/0083908 A1* | 3/2018 | Dotan-Cohen ......... H04L 51/24 |
| 2019/0050774 A1* | 2/2019 | Divine .................... G16H 50/20 |
| 2019/0171693 A1* | 6/2019 | Dotan-Cohen ......... H04L 51/18 |
| 2019/0259377 A1* | 8/2019 | Mertens ................ G06F 16/638 |
| 2019/0364003 A1* | 11/2019 | Sachdeva .............. G06F 40/289 |
| 2020/0004808 A1* | 1/2020 | Yao ....................... G06F 40/232 |
| 2020/0257726 A1* | 8/2020 | Raviv .................... G06F 16/83 |

OTHER PUBLICATIONS

U.S. Appl. No. 16/936,943, filed Jul. 23, 2020, Daga et al..

\* cited by examiner

SMART CONTENT INDICATOR BASED ON RELEVANCE TO USER

FIELD

Embodiments of the present disclosure relate generally to communication methods and specifically to organizing and accessing electronic data.

BACKGROUND

Current users of various communication modalities have a lot of content to track, view, and organize. Oftentimes, a single communication can have so much content displayed within the communication (or linked or otherwise attached to the communication) that users find it to be time consuming or error-prone in order to figure out which parts of the communication are relevant to the user.

BRIEF SUMMARY

When communications involving groups of people are distributed, they are often sent to many parties at once and contain multiple portions of content that have varying relevance to different recipients or groups of people within the recipients. For example, when meeting minutes are distributed as a document, the document is typically sent to various members of one or more teams associated with the meeting, and the document will have different sections of content that have varying relevance for different members (or different sets of members) of the team(s). Sometimes, various sections of content that apply to different members (or different sets of members) of the team(s) will not be applicable to other members (or different sets of members of the team(s)).

This can become even more problematic in projects that grow over time because as the project grows, communications associated with the project often become larger and more complex, and may include additional teams and additional team members. This can make finding relevant content within a communication a time-consuming and error-prone exercise for each recipient. The process of finding information in a communication also becomes even more error prone and time consuming as the project continues to grow. Team members can waste a lot of time reading such communications and trying to identify relevant content. This is not only problematic for members of projects or teams, the problem of finding relevant content happens when users access other types of communications, including other types of documentation, transcripts of conference calls, webpage content, etc., because users must read and sort through information that is not relevant to them. Thus, finding relevant content often wastes time and resources, and decreases productivity. There is therefore a need for methods and systems that indicate content within a communication that is relevant to a user.

Various embodiments disclosed herein use an information aggregator, a profile analyzer, a content organizer, and a user interface (UI) plug-in for a user to configure the indication of relevant content. The information aggregator may fetch and aggregate user data and any relevant information related to the user. The profile analyzer may analyze data from the information aggregator in order to build user profiles. The user profiles define information that is relevant to a user, including roles and responsibilities, and can also include charts in order to define areas of information that are relevant to the user. The content organizer analyzes content for relevance, for example by comparing the content to the user profile(s). The content organizer can thereby assign relevance to sections of content. The content can be analyzed for other information, such as by assigning priorities to sections of content in addition to relevancies. Thus, embodiments include analyzing the content to determine various types of relevance for pieces of content. Other types of relevance, such as priorities, can be based on the determination(s) of relevance. Using the UI plug-in, a user can select to format and display the relevant content in any manner desired.

Artificial intelligence (AI), including the utilization of machine learning (ML), can be used in various aspects disclosed herein. For example, as discussed, various levels of content can be assigned different relevancies, and this can be configurable by artificial intelligence and/or by user preference. Artificial intelligence, as used herein, includes machine learning. Artificial intelligence and/or user preference can configure information that is used to determine relevance. For example, artificial intelligence and/or user preference can determine which information is compared to content in order to determine a relevance of the content. Artificial intelligence and/or user preference may also be used to configure user profile(s), which may be used to determine relevance to a user (e.g., the user associated with the user profile) by comparing the content to information contained within the user profile.

Some embodiments utilize natural language processing (NLP) in the methods and systems disclosed herein. For example, machine learning models can be trained to learn what information is relevant to a user. Machine learning models can have access to resources on a network and access to additional tools to perform the systems and methods disclosed herein. The additional tools can include project development and collaboration tools including calendar applications, Jira Software and Confluence, change management software including Rational ClearQuest (Rational CQ), and quality management software, to name a few.

In certain embodiments, data mining and machine learning tools and techniques will discover information used to determine content relevance. For example, data mining and machine learning tools and techniques will discover user information, user preferences, relevance of content, levels of relevance, key word(s) and/or phrases, thresholds, comparison(s) to threshold(s), configuration(s) of content organization of content, and configuration(s) of a user interface, among other embodiments, to inform an improved content organization for one or more users.

Machine learning may manage one or more types of information (e.g., user profile information, communication information, etc.), types of content (including portions of content within communication information), comparisons of information, levels of relevance, and organization (including formatting of content). Machine learning may utilize all different types of information. The information can include various types of visual information, documents (including markup languages like Hypertext Markup Language (HTML)), and audio information (e.g., using natural language processing). Inputs and outputs, as described herein, may be managed by machine learning. Machine learning may determine variables associated with information, and compare information (including variables within the information) with thresholds to determine relevance. The relevance may determine content organization based on rules associated with the relevance. Machine learning may manage properties (including formatting, hiding and/or reorganizing) and configurations of the organized content. Any of the information and/or outputs may be modified and act as feedback to the system.

In some aspects, methods and systems disclosed herein use information to determine relevancies for content. Relevance, and variations thereof, can refer to a determination of how closely a piece of information relates to another piece of information. For example, information may be information that is related to a user, and includes and is not limited to user profile information, roles, responsibilities, group membership, association with groups, team membership, data from collaboration tools, and information from interactions of the user. Information that is related to a user may be obtained from groups or entities associated with the user. Artificial intelligence and/or user preferences may determine the information that is relevant to a user. For example, artificial intelligence and/or user preference may determine what information is relevant to one or more users, and then use the information to build a profile associated with one or more users, where the profile defines what information (or variables within the information) is relevant to the user, and other properties of the relevance (e.g., type of relevance (importance, priority, rank, etc.), level of relevance, etc.). Artificial intelligence and/or user preference may use the profile to compare information with content of a communication to determine relevance of the content (including any differences in relevance of various portions of the content). Relevance of information is used in various embodiments herein to determine content organization based on rules for how the content should be organized when the content has a certain relevance.

Relevance, as described herein, includes determining how closely related information is. The determination may be by comparison, and may use any criteria, such as thresholds and/or one or more key words. The information may be content within a communication, where a communication can contain one or more pieces (also referred to herein as portions, sections, or items) of content, and may include content that ranges from being not related at all (e.g., not relevant) to content that is directly related (e.g., highly relevant). Portions of content may also be referred to herein as simply "content." There may be only two levels of relevance (e.g., relevant and not relevant), or any number of levels of relevance. Any information may be compared to determine relevance. In various embodiments, user information may be used to determine relevance. The user information may include profile information, such as one or more user profiles, that is compared to content. Various types of relevance may be determined for one or more pieces of information, including relevance, priority, importance, precedence, weight, rank, etc. For example, relevance may determine how related content is to a user, while priority ranks how important the content is. In various embodiments, priority may be based on how relevant a piece of content is. Any combination of one or more types of relevance may be configured and used. For example, content may have high relevance with a low priority and a low rank, content may have high relevance with a high importance and high rank, content may have low relevance with a high importance and a low priority, etc. Content may have any combinations of types of relevance.

As used herein, the term content organizing refers to various types of actions, including but not limited to organizational actions, managing information, processing information, using processing decisions, organizing views of content (a view is also referred to herein as a display, a user interface, a related items user interface, and a smart user interface), determining additional information (and organizing the additional information), monitoring and/or searching for information (including monitoring for thresholds), monitoring activity of one or more users, and interacting with databases, among others. Content within a communication may be organized (e.g., reorganized) so that the content has a differently organized view (e.g., has a different layout) than how the communication originally presented the content. A layout of information may also be referred to herein as a summary. As an illustrative example, portions of the content within the communication may be moved up to the front of the communication, other portions of the communication may be moved down to the bottom of the communication, and/or additional content may be added. Content may be reorganized within the communication in addition to having content hidden and formatting changes made.

Content organizing may make various changes to the formatting of content within a communication. Content may be hidden, have different levels of transparency applied to various portions of content, may be reorganized, and/or have various type of formatting applied. The organizing of the content can be configured as desired by any one or more users, and can be used to indicate different meanings. For example, different organizing actions can signify different relevancies. Different organizing actions can signify different categories, including and not limited to an informational category, an action category, a reference category, an approval category, an assistance category, and a hold category. Content organizing can be referred to as simply "organizing," "actions," and "managing" herein, as well as variations of those terms.

Content organization may be based on relevance. Content organization includes and is not limited to hiding/showing content and formatting content, including highlighting, reorganizing, and changing properties of the content such as font color, size, italicizing, and bolding. Formatting also includes adding content, such as adding action items, adding a list that is relevant to the user, etc. Thus, in some aspects, the content layout can be modified and additional content may be added. In some embodiments, the content organization for one or more communications is determined automatically, e.g., before any interaction with a user who views the content. In other words, in some embodiments, the content layout can be configured before anything is displayed to the user or received by the user. In other embodiments, a user may interact with the methods and systems disclosed herein to apply a desired content organization to one or more communications after viewing or receiving the communication.

The methods and systems disclosed herein include embodiments where content is organized using multiple relevancy levels. Different levels and/or types of relevance can be organized differently (e.g., hiding content that is not relevant or highlighting relevant content without hiding any content). Thus, embodiments include organizing the content (e.g., what is highlighted, hidden/shown, reorganized, etc.) based on different relevancies of the content within the communication, where the different relevancies define the changes to the content. Content can be organized based on any criteria, such as levels of relevance (e.g., relevancies), and levels of priority (e.g., priorities, importance, etc.), among others. Different types of organization can be combined with different types of relevance. For example, in some aspects, relevant content may be shown (with not relevant content hidden) and the relevant content can be organized (e.g., important on top) based on differences in priority. Also, different organizational actions may be taken on the content based on different relevancies as well as different priorities. For example, relevant content may be hidden, partially hidden (e.g., shaded), or shown with highlighting, and the relevant content may be organized based on differences in priority.

Levels of relevance may be determined based on any information. There may be only one level, or multiple levels for relevance. There may be only one level of relevance, but multiple levels for priority (or, similarly, multiple levels of other types of relevance). All types of relevance, as well as any levels, are customizable. Further, the organizational actions associated with any relevancies and any levels are customizable. Options related to the content organization are also customizable. For example, a user may determine how a user interface for the content organization may look, including what interactive options may be presented to a user and what actions may be performed. Customization may be implemented by the user and/or the system, including by artificial intelligence.

Thus, the systems and methods disclosed herein include embodiments where content having various relevancies may be determined and organized by user(s) and/or the system itself (including automatically and/or by artificial intelligence). The content organization may be based on rules (also referred to herein as settings), where the rules define relationships between one or more of the relevancies, types of relevancies, levels, thresholds, and/or other information or variables. The rules may be managed by automatic processing, by one or more users, and/or by artificial intelligence. Using the rules, the systems and methods disclosed herein may suggest organizational actions and/or updates to organizational actions to a user for confirmation of the action/update before implementing the action/update, or may automatically execute the organizational actions and/or updates to the organizational actions without user input. In various aspects, a learning engine may be used that is capable of learning what has been done on content by users and does a same or similar action (e.g., finds similar content and performs a same or similar action) and/or adjusts organizational actions (e.g., content organization) based on the learning.

These and other needs are addressed by the various embodiments and configurations of the present disclosure. The present disclosure can provide a number of advantages depending on the particular configuration. These and other advantages will be apparent from the disclosure contained herein.

According to some aspects of the present disclosure, methods of managing communications include: receiving a first meeting communication; receiving a second meeting communication; determining at least one matching variable in common between the first meeting communication and the second meeting communication; comparing a property of the at least one matching variable to a first threshold to determine a configuration of an organizational action; and based on the comparison of the property, performing the organizational action.

In some embodiments, the performing the organizational action includes at least one of: displaying a related items user interface, displaying a follow up user interface, and displaying a meeting summary based on a content of a first meeting.

According to some aspects of the present disclosure, methods of managing communications, the methods including: receiving a first communication; obtaining a user profile; comparing a user property from the user profile with a first content and a second content in the first communication; determining a first relevancy of the first content and a second relevancy of the second content; configuring a first content layout of the first communication based on the first relevancy and the second relevancy; and displaying the first content layout.

In some aspects, the first relevancy is relevant to the user profile, the second relevancy is not relevant to the user profile, and the first content layout displays the first content and does not display the second content based on the first relevancy and the second relevancy.

In some aspects, the first relevancy is relevant to the user profile, the second relevancy is not relevant to the user profile, and the first content layout highlights the first content and does not highlight the second content based on the first relevancy and the second relevancy.

In various embodiments, the methods include receiving, after the obtaining the user profile, a new user information; and updating the user profile to include an updated user property based on the new user information.

In some aspects, the comparing the user property from the user profile with the first content and the second content includes comparing the updated user property with the first content and the second content.

In some aspects, the user profile is based on information including a user skill and a user group, where the information is obtained from a work management database.

In some aspects, a machine learning process updates the user profile based on the second communication.

In various embodiments, the methods include determining a first priority of a third content in the first communication and a second priority of a fourth content in the first communication, where the configuration of the first content layout is based on the first priority and the second priority.

In some aspects, an order of the third content and the fourth content in the first content layout is based on a priority difference in the first priority and the second priority.

In some aspects, the first priority and the second priority are based on at least one of a paragraph content and a sentence content within the first communication.

In various embodiments, the methods include receiving, after receiving the first communication, a second communication; comparing the user property with a third content and a fourth content in the second communication; determining a third relevancy of the third content and a fourth relevancy of the fourth content; configuring a second content layout of the second communication based on the third relevancy and the fourth relevancy; and displaying the second content layout.

In some aspects, the first content layout displays a layout of information in the first communication in multiple levels, where at least some of the information is indicated as relevant based on one or more levels of the multiple levels.

In some aspects, the multiple levels indicate the first relevancy and the second relevancy, where at least one level of the multiple levels is hidden.

In some aspects, a machine learning process determines the first relevancy and the second relevancy.

According to some aspects of the present disclosure, communication systems include a processor; and computer memory storing data thereon that enables the processor to: receive a first communication; obtain a user profile; compare a user property from the user profile with a first content and a second content in the first communication; determine a first relevancy of the first content and a second relevancy of the second content; configure a first content layout of the first communication based on the first relevancy and the second relevancy; and display the first content layout.

In some aspects, the processor is further enabled to receive multiple communications including the first communication, to determine a set of communications from the multiple communications for analysis, to analyze the set of communications to configure a second content layout of the first communication, and to display the second content layout.

In some aspects, a machine learning process determines the set of communications and analyzes the set of communications.

In some aspects, the first communication is a document accessible by group members, where a user associated with the user profile is one of the group members.

In some aspects, the first communication includes links to tasks assigned to group members, where a user associated with the user profile is one of the group members, where the tasks include a first task assigned to the user and a second task not assigned to the user, where the first relevancy is based on the first task being assigned to the user and the second relevancy is based on the second task being not assigned to the user, and where the first content layout is based on a difference between the first relevancy and the second relevancy.

According to some aspects of the present disclosure, systems include a server including a processor and a message routing engine that is executable by the processor and that enables the processor to: receive a first communication; obtain a user profile; compare a user property from the user profile with a first content and a second content in the first communication; determine a first relevancy of the first content and a second relevancy of the second content; configure a first content layout of the first communication based on the first relevancy and the second relevancy; and display the first content layout. Systems may include any type of communication system, including contact centers and other types of organizations.

As used herein, information includes communications, messages, electronic records, content, visual content including text and images, audio content, rich media, data, and/or data structures. This information can include documents, database info, video content, web content including markup language (such as Hypertext Markup Language (HTML) content and Extensible Markup Language (XML)), content related to one or more users, thresholds, event information, formatting properties, and other types of information. Communication include emails, messages, documents, files, action items, reports (including status reports and meeting minutes), etc. Information includes content, and communications include content (also referred to herein as data). Content may be one type or multiple types (e.g., text, images, hyperlinks, etc.) and there may be multiple pieces of content within a communication or a piece of information, regardless of content type. Information contains one or more variables (e.g., user names, roles, responsibilities, key word(s), etc.) and thus, content may contain one or more variables. Communications may be data that is stored on a storage/memory device, and/or transmitted from one communication device to another communication device via a communication network.

Communications include messages. A message may be transmitted via one or more data packets. The formatting of such data packets may depend upon the messaging protocol used for transmitting the electronic records over the communication network. Event information can be any information related to events, including calendar information, documents that include event information (e.g., roles, responsibilities, links to information, etc.), meeting information (including meeting agendas, topics, dates/times, attendee information, meeting minutes, meeting summaries, voice-to-text transcripts, any other meeting communication, etc.) and action items. Action items may include activities or tasks to be performed by a user and/or a group of users (e.g., assigned to a user and/or a group of users). Action items may be referred to herein as tasks, lists, to-do lists, to-do task lists, task lists, and variations of those terms.

Information related to communications may be referred to herein as communication information, communication data, or communication content, and variations of these terms. Communication information can include any type of data related to communications of a user and/or entity (e.g., information being sent to user(s), received from user(s), created by user(s), accessed by user(s), viewed by user(s), etc.). Content of a communication can include information associated with the communication as well as information contained within the communication. Content of a communication may include information not only that is sent and received, but also other information such as information that a user does not necessarily send or receive. Content of communications may be classified in various ways, such as by a timing of the content, items the content is related to, users the content is related to, key words or other data within fields of the communication (e.g., to field, from field, subject, body, etc.), among other ways of classifying the content. The content may be analyzed based on information associated with the content and/or variable(s), including the location of the content and/or variables as it relates to the communication (e.g., a field, sender, recipient, title, or body location within the communication).

As used herein, a data model may correspond to a data set that is useable in an artificial neural network and that has been trained by one or more data sets that describe communications between two or more entities. The data model may be stored as a model data file or any other data structure that is useable within a neural network or an Artificial Intelligence (AI) system.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "analyze," "process," "execute," "manage," "calculate," and "compute," and variations thereof, as used herein, are used interchangeably and include any type of methodology, process, mathematical operation or technique. The term "manage" includes any one or more of the terms determine, recommend, configure, organize, show (e.g., display), hide, update, revise, edit, and delete, and includes other means of implementing actions (including variations thereof).

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Illustrative hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very large-scale integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides illustrative embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the illustrative embodiments will provide those skilled in the art with an enabling description for implementing an illustrative embodiment. It should however be appreciated that the present disclosure may be practiced in a variety of ways beyond the specific detail set forth herein.

While the illustrative aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Embodiments of the disclosure provide systems and methods that relate generally to communication methods and specifically to organizing and accessing electronic data. In some aspects, machine learning tools may support organizing and accessing of data. Embodiments of the present disclosure are also contemplated to automatically organize and present information, as appropriate, based on rules in combination of thresholds and/or an analysis of previous actions.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
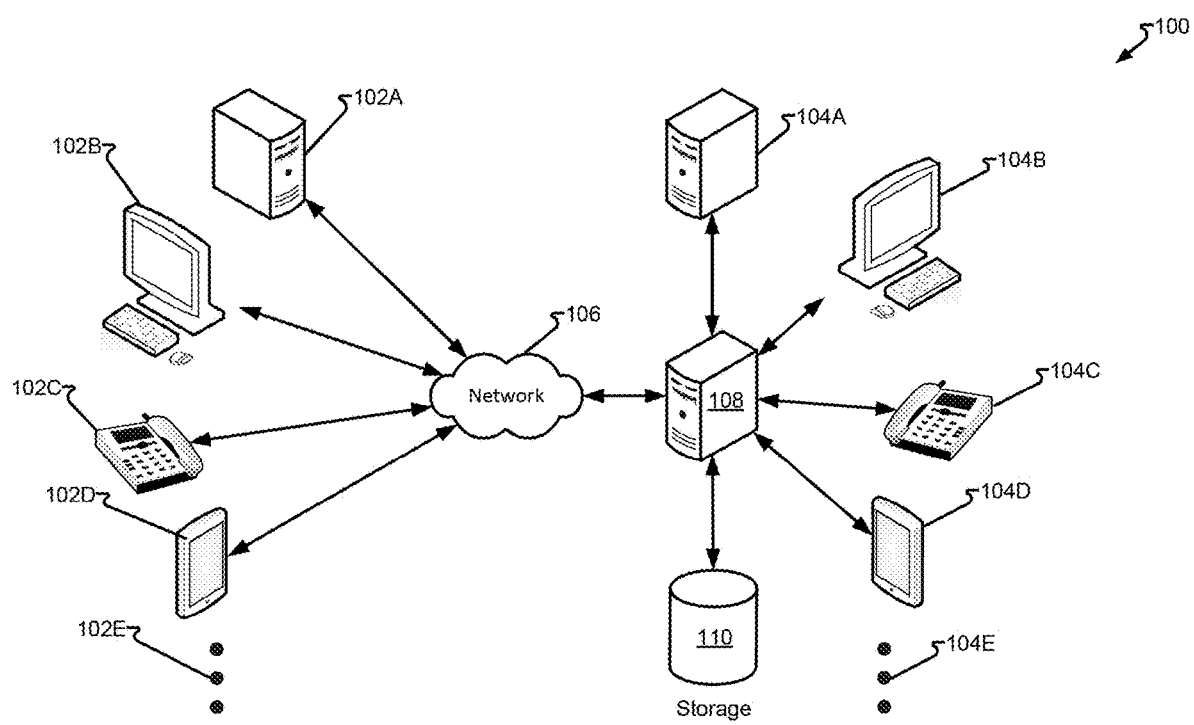
FIG. 1 is a block diagram illustrating a first system in accordance with at least some embodiments of the present disclosure.

FIG. 1 depicts system 100 in accordance with at least some embodiments of the present disclosure. In one embodiment, first user communication device 102 comprises one or more devices and/or device types, such as first user communication device 102A being a server, computer, or other communication component; first user communication device 102B comprising a computer, laptop, or other application-executing device, such as to execute a softphone, messaging system, video/voice-over-IP, etc. First user communication device 102A and first user communication device 102B may operate independently or cooperatively. First user communication device 102C may be embodied as a telephone (e.g., plain old telephone system (POTS) device, and/or a voice-over-IP (VoIP) device); First user communication device 102D may be a handheld device, such as a personal data assistant, cellular telephone/smart-phone, tablet, etc., which may communicate via cellular communications and/or other wired or wireless networking communications (e.g., WiFi, WiMax, Bluetooth, etc.); and other first user communication device 102E which may comprise other current or future communication devices for use by a user (not shown in FIG. 1) to communicate with one or more second user communication device 104.

In another embodiment, second user communication device 104 comprises one or more devices and/or device types, such as second user communication device 104A which may comprise a server, computer, or other communication component; second user communication device 104B, which may comprise a communication terminal with software and/or communications to other components (e.g., processors, storage/memory devices, etc.); second user communication device 104C which may be embodied a telephone (e.g., POTS, VoIP, etc.); second user communication device 104D may be a handheld device, such as a personal data assistant, cellular telephone/smart-phone, tablet, etc., which may communicate via cellular communications and/or or other wired or wireless networking communications (e.g., WiFi, WiMax, Bluetooth, etc.); and other second user communication device 104E which may comprise other current or future communication devices for use by a user (not shown in FIG. 1) to communicate with one or more first user communication device 102.

System 100 omits common components typically utilized to facilitate communication between one or more first user communication device 102 and one or more second user communication device 104. The network 106 can be any type of network familiar to those skilled in the art that can support data communications using any of a variety of commercially-available protocols, including without limitation SIP, TCP/IP, SNA, IPX, AppleTalk, and the like. Merely by way of example, the communication network 104 may correspond to a LAN, such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the IEEE 802.11 suite of protocols, the Bluetooth® protocol known in the art, and/or any other wireless protocol); and/or any combination of these and/or other networks. Network 106 may be or support communications comprising one or more types (e.g., video, analog voice, digital voice, text, etc.) and/or media (e.g., telephony, Internet, etc.). Network 106 may comprise portions of other networks (e.g., Ethernet, Wi-Fi, etc.) and/or virtual networks (e.g., VPN, etc.).

Communications between ones of first user communication device 102 and ones of second user communication device 104 may be intercepted or monitored by communication server 108 having a microprocessor with a memory integrated therewith or accessible. Communication server 108 monitors the connection data of the communication and, if a criterion or threshold is met, causes at least a portion of the communication to be stored in data storage 110. For example, key word(s) in a communication, or other variables or properties of the communication, etc., may be intercepted, monitored, scanned, searched, and stored. In another embodiment, data storage 110 may maintain an index, pointer, or other indicia to reference to the portion of the communication. The communication server 108 may include, or communicate with, various other servers, memories, modules, and/or engines to implement methods and systems of the present disclosure. The communication server 108 may interact with a set of guidelines (e.g., as a set of static instructions) or by using machine learning. In various embodiments disclosed herein, the communication server 108 may interact with an intelligent organizer server, as described herein.

Figure 2:
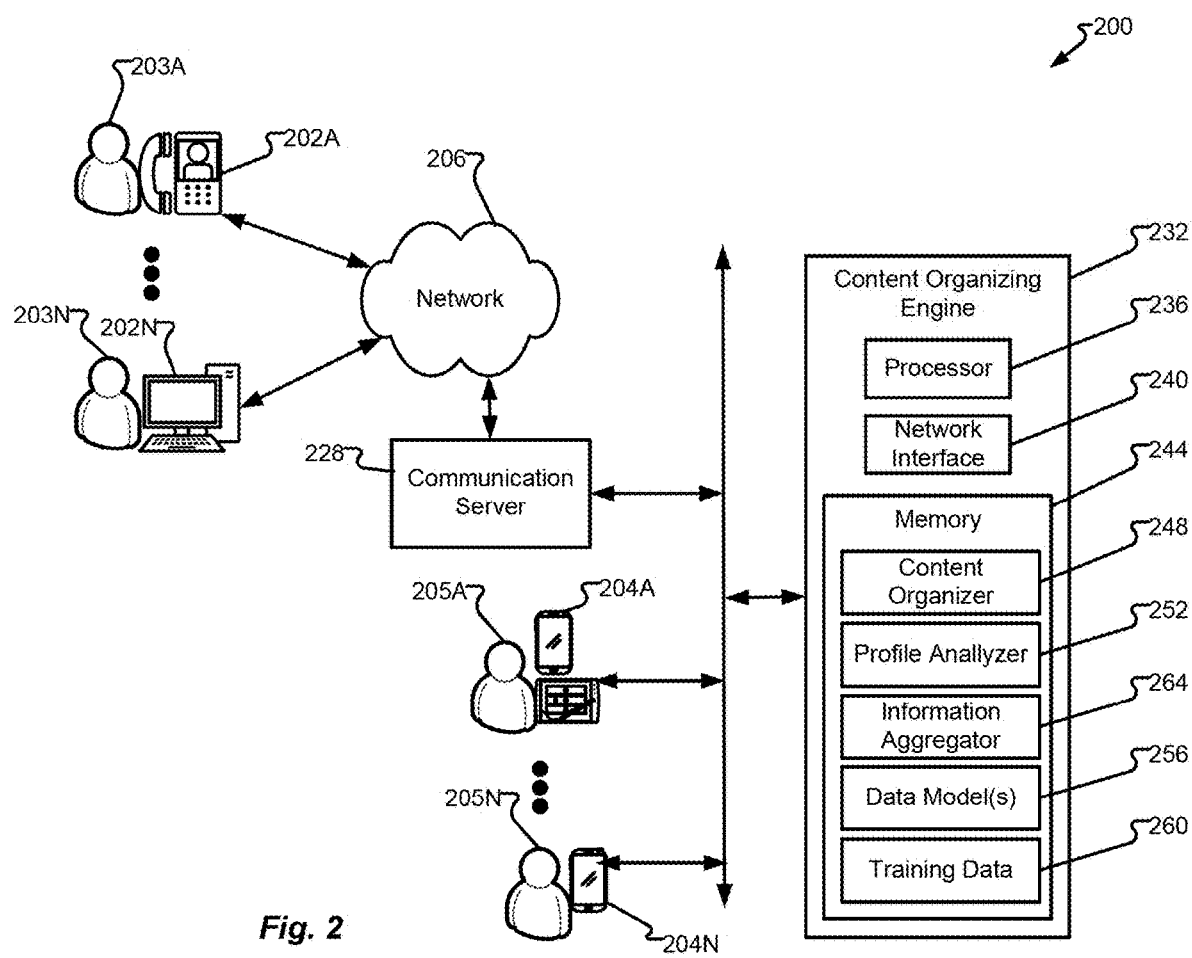
FIG. 2 is a block diagram illustrating a second system in accordance with at least some embodiments of the present disclosure.

Turning to FIG. 2, a communication system 200 will be described in accordance with at least some embodiments of the present disclosure. In some aspects, the components shown in FIG. 2 may correspond to like components shown in FIG. 1. The communication system 200 is shown to include a communication network 206 that interconnects users 203A-203N via communication devices 202A-202N with users 205A-205N via communication devices 204A-204N. Users may also be referred to herein as people, persons, participants, recipients, senders, humans, human agents, administrators, employees, members, team members, attendees, and variations of these terms. Users may be associated with entities, and an entity may be referred to herein as a business, an organization, a group, an institution, and variations of these terms. The network 206 may connect to communication devices in any manner, including via communication server 228. Thus, users 205A-205N may communicate with users 203A-203N through their respective devices and communication server 228 in addition to network 206. Communication server 228 may also communicate with content organizing engine 232 via a communication channel.

Communication devices as disclosed herein (e.g., 202A-202N and/or 204A-204N) may correspond to a computing device, a personal communication device, a portable communication device, a laptop, a smartphone, a personal computer, and/or any other device capable of running an operating system, a web browser, or the like. For instance, a communication device may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices (e.g., 204A-204N and/or 202A-202N) may also have any of a variety of applications, including for example, a database client and/or server applications, web browser applications, chat applications, social media applications, calling applications, etc. A communication device (e.g., 204A-204N and/or 202A-202N) may alternatively or additionally be any other electronic device, such as a thin-client computer, Internet-enabled mobile telephone, and/or personal digital assistant, capable of communicating via communication network 206 and/or displaying and navigating web pages or other types of electronic documents.

In some embodiments, one or more servers may be configured to perform particular organizational actions or sets of organizational actions specific to supporting functions of the content organizing engine 232. For instance, the communication server 228 may correspond to one or more servers that are configured to receive communications and make routing decisions for the communications, as well as manage other data such as information related to communications, including content. The communication server 228 may correspond to a single server or a set of servers that are configured to establish and maintain communication channels between users 203A-203N and 205A-205N and may contain processor(s) and memory to store and manage communications data. In some embodiments, the communication server 228 may work in cooperation with the content organizing engine 232 to manage and process information, as described herein. The content organizing engine 232 may be referred to as a message routing engine.

In some embodiments, the communication server 228 may be responsible for establishing and maintaining communications including digital text-based communication channels as well as voice channels between users 203A-203N and 205A-205N. The communication server 228 can establish and maintain communication data. As discussed herein, communications includes and is not limited to any data involving communications of a user. Thus, as some non-limiting examples, the communication server 228 may be configured to process calendar information, documents, and communications received from a user communication device (e.g., 204A-204N and/or 202A-202N) and utilize document protocols, a calendar protocol, and a messaging protocol. Non-limiting examples of protocols that may be supported by the communication server 228 include Internet Message Access Protocol (IMAP), Post Office Protocol (POP), Simple Mail Transfer Protocol (SMTP), and Exchange. The communication server 228 may alternatively or additionally be configured to support real-time or near-real-time text-based communication protocols, video-based communication protocols, and/or voice-based communication protocols. Various functionality of the communication server 228 may be performed by the content organizing engine 232 and/or other servers and server components such as additional memory and processors (not shown).

It should be appreciated that the communication server 228 may be configured to support any number of communication protocols or applications whether synchronous or asynchronous. Non-limiting examples of communication protocols or applications that may be supported by the communication server 228 include the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc. Again, in addition to supporting text-based communications, the communication server 228 may also be configured to support non-text-based communications such as voice communications, video communications, and the like.

The communication server 228 may be configured to manage any type of content. The content can be related to entities or users 203A-203N and 205A-205N. The communication server 228 may be configured to maintain state information for one or more users 203A-203N and 205A-205N at any given point in time. In some embodiments, the communication server 228 may further interact with the content organizing engine 232 (including the content organizer 248, the profile analyzer 252, and/or the information aggregator 264) to configure the methods and systems disclosed herein. These capabilities of the communication server 228 may be provided by one or more modules stored in memory and executed by one or more processors of the communication server 228.

In addition, the communication server 228 may be responsible for obtaining user 203A-203N and/or 205A-205N information from various sources to support the methods and systems disclosed herein. In some embodiments, the communication server 228 may be configured to maintain a user database (including and not limited to a profile database) that may be internal to, or external from, the communication server 228. The user database (not shown in FIG. 2) may be used to store user information in any number of data formats. The communication server 228 may be configured to obtain and provide relevant user information to any of the content organizer 248, the profile analyzer 252, and/or the information aggregator 264, thereby facilitating the content organizing engine's 232 ability to implement the embodiments disclosed herein.

The content organizing engine 232 may be configured to coordinate tasks between the content organizer 248, the profile analyzer 252, and/or the information aggregator 264. The content organizing engine 232, the content organizer 248, the profile analyzer 252, and/or the information aggregator 264 may have any configuration and may be made up of more or less components than what is shown in FIG. 2. For example, the content organizing engine 232 may perform all of the tasks of the content organizer 248, the profile analyzer 252, and the information aggregator 264, as described herein, or each of the content organizer 248, the profile analyzer 252, and/or the information aggregator 264 can perform tasks independently, without interacting with the content organizing engine 232. In various embodiments, settings of the content organizing engine 232, or any of its components, may be configured and changed by any users 203A-203N and 205A-205N and/or administrators of the system. Settings can include thresholds as well as settings related to how content is managed. Settings may be configured to be personalized for one or more communication devices (e.g., 204A-204N and/or 202A-202N) users (e.g., 203A-203N and 205A-205N), and/or other groups of entities, and may be referred to herein as profile settings, user settings, or organization settings.

The content organizing engine 232 may organize content based on variables associated with the information, based on thresholds set by automatic processing, by artificial intelligence and/or based on input from one or more users 203A-203N and 205A-205N. The thresholds may be set to determine when and/or how to organize content and to determine what organizational actions to perform on the content. As one illustrative example, a threshold may be set to determine that there is a matching variable between two communications, and a rule may specify that if there is a matching variable, then content organization is performed. As another illustrative example, a threshold may be set to execute an organizational action if a variable (e.g., a key word) in content matches a variable (e.g., a key word) in the user profile. If a variable matches, the threshold may trigger a rule that manages the content to provide some type of content organization. For example, a portion of the content (e.g., a sentence, paragraph, or section) that contains the key word may be formatted or otherwise organized according to the rule (or content that does not contain the key word may be hidden), and the organized content is displayed to a user associated with the user profile. The organized content may be referred to herein as a summary view. Organizational actions may thereby be managed by thresholds. One or more organizational actions may occur based on one or more thresholds being met or exceeded.

Rules and settings may be used in addition to, or instead of, thresholds. For example, if one communication has a matching variable with another communication, then a rule may determine that content organization occurs. Similarly, content organization may be managed based on any rules, settings, and/or thresholds. In various embodiments, variables associated with information may determine content organization based on one or more thresholds. The thresholds may be related to a relevance and one or more variables may be compared to a threshold to determine an organizational action (e.g., by comparing the variable to a threshold Content organizing may be associated with any desired information, such as one or more key words, thresholds, variables or properties of information, etc., and content may be organized using any desired criteria. Content organizing may be personalized to one or more communication devices (e.g., 204A-204N and/or 202A-202N), users (e.g., 203A-203N and 205A-205N), and/or entities, and may have any properties desired by a user (e.g., a desired run time, preferred programs to use to perform organizational actions, preferred configurations, etc.).

Content organizing can be configured in any manner. For example, various levels of organization may be defined, such as showing a certain set of information at one level, another set of information at another level, changing the organization of the information at different levels, etc. The organization and levels may be defined based on variables within the information and/or based on a comparison of one or more variables with one or more thresholds. The variables (or comparisons of the variables) may determine relevancies and thus, content layouts. The properties of information may be organized independently of the levels of information. For example, different sets of information may have different colors while various levels can show different amounts of information. Advantageously, hiding some portions of the content and/or changing formatting of some portions of the content within the communication can improve the likelihood that a user will see relevant content within the communication.

Based on relevancies, the order of content within a communication may be reordered, in addition to or instead of, being hidden and/or having the formatting changed. For example, the order of content within a communication can be changed so that portions of the content are at the top of the communication and other portions of the content are at the bottom of the communication. Advantageously, reordering the content within the communication can improve the likelihood that a user will see relevant content within the communication. The properties of information may be related to the levels of information, or they may be independent of one another. Settings related to the content organizing (e.g., the variables and levels and their associated implementation), and also the content organizing itself, can be configured to be implemented automatically, implemented by artificial intelligence, and/or implemented when selected by a user.

Settings (also referred to herein as rules) related to organizational actions can include settings that are personalized for any variable, threshold, user, device, entity, or groups thereof. For example, users 203A-203N and 205A-205N may each have profile settings that configure, based on variables in information, one or more of their desired organizational properties (including thresholds, organizational actions, preferred configurations of organizational settings, etc.), among other user preferences. Settings chosen by an administrator or a certain user may override other settings that have been set by other users 203A-203N and 205A-205N, or settings that are set by default. Alternatively, settings chosen by a user may be altered or ignored based on any criteria at any point in the process. For example, settings may be created or altered based on a user's identity, association with a group or entity, a role, and/or a membership, among others. Settings may be updated when new information is received. For example, a new communication may arrive and user profiles may be updated based on the new content and/or content organization rules can be updated based on the new content.

Some settings configured by a user can cause an organizational action to occur automatically (e.g., for certain types of information, for one or more communication devices (e.g., 204A-204N and/or 202A-202N), when a threshold is met or exceeded (e.g., when an organizational action has been selected multiple times for a specific type of communication), etc.). One or more thresholds may be set, and they may each be associated with any information (e.g., any variable or property). In addition, content organizing engine 232 may automatically configure one or more thresholds and associated content organizing. Regardless of how settings were initially configured, thresholds (and rules associated therewith) may vary based on a user's preferences (including preferences regarding specific communication devices (e.g., 204A-204N and/or 202A-202N)), variables associated with one or more users or entities, properties associated with users or entities, groups that a user is a member of, etc.

Additional capabilities of the content organizing engine 232 will be described in further detail with respect to operation of the content organizer 248, the profile analyzer 252, and the information aggregator 264, which are shown to be provided by the content organizing engine 232. While certain components are depicted as being included in the content organizing engine 232, it should be appreciated that such components may be provided in any other server or set of servers. For instance, components of the content organizing engine 232 may be provided in a separate engine (not shown) and/or in the communication server 228, in an engine of the communication server 228, etc., and vice versa. Further still, embodiments of the present disclosure contemplate a single server that is provided with all capabilities of the communication server 228 and the content organizing engine 232.

The memory 244 may include one or multiple computer memory devices. The memory 244 may be configured to store program instructions that are executable by the processor 236 and that ultimately provide functionality of the content organizing engine 232 described herein. The memory 244 may also be configured to store data or information that is useable or capable of being called by the instructions stored in memory 244. One example of data that may be stored in memory 244 for use by components thereof is one or more data model(s) 256 and/or training data 260. The memory 244 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 244, in some embodiments, corresponds to a computer-readable storage media and while the memory 244 is depicted as being internal to the content organizing engine 232, it should be appreciated that the memory 244 may correspond to a memory device, database, or appliance that is external to the content organizing engine 232.

The content organizer 248, may be configured to analyze content, which may be any type of information, including information that is historical or in real-time. The content organizer 248 may provide appropriate signaling to a communication device (e.g., 204A-204N and/or 202A-202N) and/or the communication server 228 that enables the content organizer 248 to receive information from the communication device(s) and/or the communication server 228 and organize content. For example, the content organizer 248 may analyze communications that relate to a user (e.g., a user being provided relevant content) and determine any portions of the content that are relevant to the user by comparing the content to a user profile associated with the user. The content organizer 248 then may assign relevancies to a selected communication as specified by rules associated with the user and the relevancies, and determine a content organization of the communication. The content organization is provided to the user for the selected communication.

The profile analyzer 252 may be configured to analyze information associated with one or more users, groups, etc. The information can include any type of information, including audio and visual information. The information to analyze may be identified by the profile analyzer 252 from user data, and may be identified by external sources, such as from data received from the communication server 228, other data received over the network 206, and/or data received from one or more users 203A-203N and 205A-205N. The profile analyzer 252 can build a user profile using automatic processing, using artificial intelligence and/or using input from one or more users 203A-203N and 205A-205N. Information that may be used to build a user profile can include and is not limited to roles and responsibilities associated with the user, data from collaboration tools, and past interactions of the user and this data may be identified by the profile analyzer 252. The profile analyzer 252 can use automatic processing, artificial intelligence, and/or one or more users 203A-203N and 205A-205N to determine what information is relevant to a user's profile and combine the information into a user profile, as well as manage the user profile when additional information is obtained that is relevant to the profile.

Profile information can be determined based on a user's interactions with information. For example, if a user always responds to a certain type of information, that information may be indicated as highly relevant to the user. Also, a user may configure which types of information is relevant to them, levels of relevance, and other elements used to build the user profile and determine relevance. For example, a user can manage key words, thresholds, organizational actions, and rules that the systems and methods disclosed herein use to organize content. The information in the user profile may include user properties. User properties may be any properties associated with the user, such as key word(s), skills, roles, responsibilities, name(s), associated groups and entities, and other properties. In some aspects, various user properties may be obtained from a work management database. In various embodiments, the profile analyzer 252 updates user profiles when new information that is relevant to the user profile is received. Thus, user profiles may contain one or more updated user properties.

Profile information may be organized and classified in various manners. The organization and classification of profile information may be determined by automatic processing, by artificial intelligence and/or by one or more users 203A-203N and 205A-205N. The profile analyzer 252 may provide appropriate signaling to a communication device (e.g., 204A-204N and/or 202A-202N) and/or the communication server 228 that enables the profile analyzer 252 to receive information from the communication device(s) and/or the communication server 228. The profile analyzer 252 may manage the user profile information in any manner; thus, a user profile can be updated (e.g., by one or more users and/or by profile analyzer 252 or other components of the system 200) based on information that includes information from databases, and also from other sources.

The content organizing engine 232 is shown to include a processor 236 and a network interface 240 in addition to memory 244. The processor 236 may correspond to one or many computer processing devices. Non-limiting examples of a processor include a microprocessor, an Integrated Circuit (IC) chip, a General Processing Unit (GPU), a Central Processing Unit (CPU), or the like. Examples of the processor 236 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

The network interface 240 may be configured to enable the content organizing engine 232 to communicate with other machines in the system 200 and/or to communicate with other machines connected with the communication network 206. The network interface 240 may include, without limitation, a modem, a network card (wireless or wired), an infra-red communication device, etc.

Illustratively, the memory 244 is shown to store the content organizer 248, the profile analyzer 252, and/or the information aggregator 264 for execution by the processor 236. In some embodiments, each of the content organizer 248, the profile analyzer 252, and/or the information aggregator 264 may correspond to a set of processor-executable instructions (e.g., a finite instruction set with defined inputs, variables, and outputs). In some embodiments, the content organizer 248, the profile analyzer 252, and/or the information aggregator 264 may correspond to an AI component of the content organizing engine 232 that is executed by the processor 236. Each of the content organizer 248, the profile analyzer 252, and/or the information aggregator 264, in some embodiments, may utilize one or more data models 256, which may be in the form of an artificial neural network, for recognizing and processing the information obtained from communication devices 202A-202N and/or 204A-204N and/or supported by the communication server 228. In some embodiments, the content organizer 248, the profile analyzer 252, and/or the information aggregator 264 may each be trained with training data 260 and may be programmed to learn from additional information, including organization of content as the organization occurs. In some embodiments, any one or more of the content organizer 248, the profile analyzer 252, and the information aggregator 264 may update one or more of the data models 256 as they learn from ongoing information.

As can be appreciated by one skilled in the art, functions offered by the elements depicted herein may be implemented in one or more network devices (i.e., servers, networked user device, non-networked user device, etc.).

Figure 3:
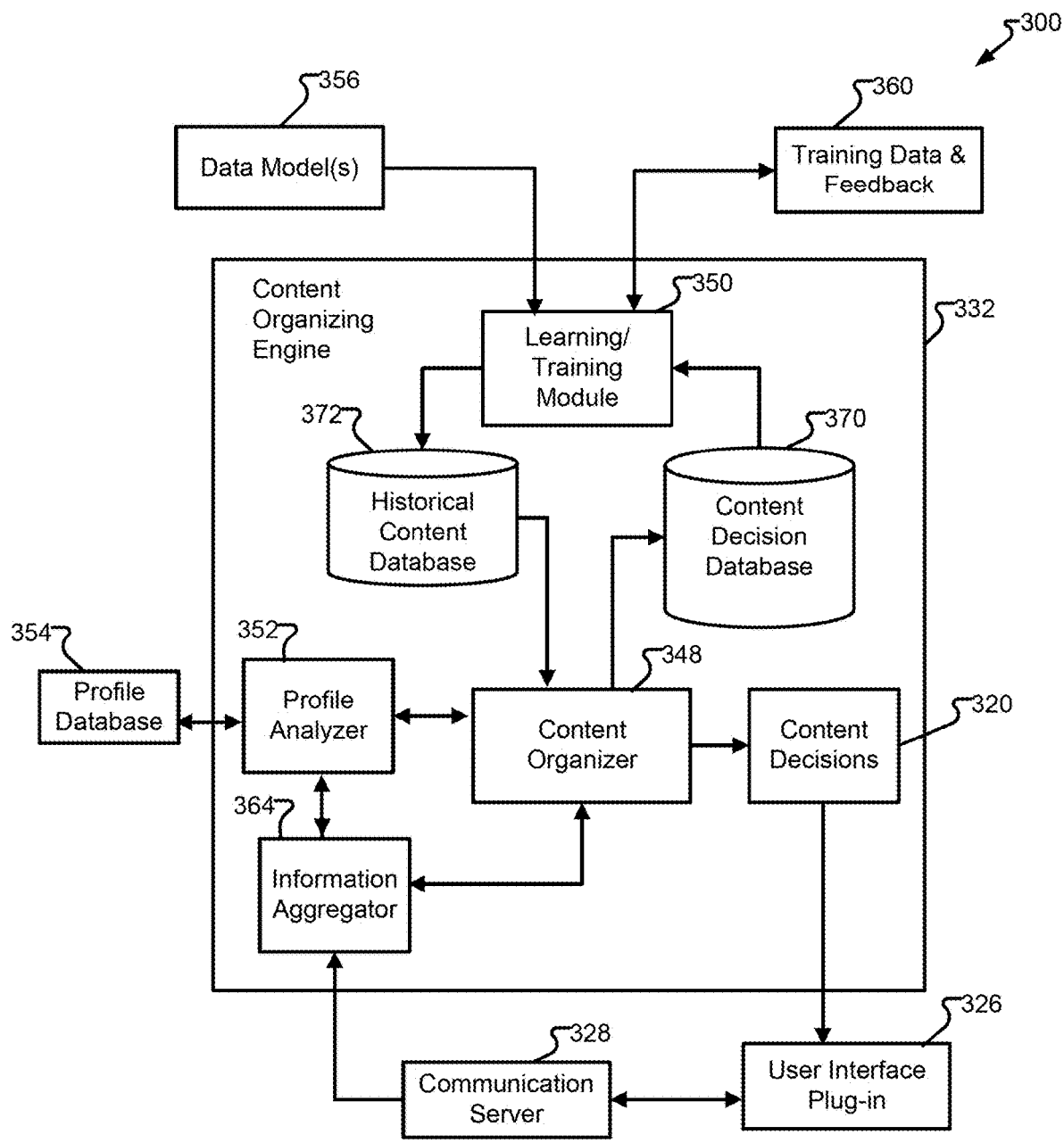
FIG. 3 is a block diagram illustrating a third system in accordance with at least some embodiments of the present disclosure.

Further details of a content organizing engine 232 utilizing machine learning are described with reference to FIG. 3. In some aspects, the components shown in FIG. 3 may correspond to like components shown in FIGS. 1 and 2. FIG. 3 shows a system 300 including an content organizing engine 332 together with a communication server 328, user interface plug-in 326, and associated components in accordance with at least some embodiments of the present disclosure.

As explained herein, in some embodiments, various components of system 300 may be combined or not present in system 300; for example, the profile database 354 may be included in the content organizing engine 332 and there may be only one engine that handles all of the components and functionality for content organizing, profile analyzing, and information aggregating.

In various embodiments, the content organizing engine 332 may correspond to the content organizing engine 232 of FIG. 2. The content organizing engine 332 can create, select, and execute appropriate processing decisions. Processing decisions may include organizing content and managing other data related to organizing content. Illustrative examples of organizing content include rearranging content, changing formatting of content, and showing and/or hiding content. Content may be organized based on relevancies of the content and actions associated with the relevancies. The content organizing engine 332 may manage content by managing organizational actions and based on the determined relevancies, as described herein. Processing decisions, including organizing content, may be handled automatically by the content organizing engine 332 without human input. The content organizing engine 332 may manage content organization based on input from historical content database 372 and/or profile database 354, and based on communication information inputs received from the communication server 328.

Components of system 300 may have access to training data and feedback 360. For example, the training data and feedback 360 may initially train behaviors of the content organizer 348 the profile analyzer 352, and the information aggregator 364, to utilize machine learning (e.g., artificial intelligence). The content organizer 348, the profile analyzer 352, and the information aggregator 364, may be configured to learn from further information based on feedback, which may be provided in an automated fashion (e.g., via a recursive learning neural network) and/or a human-provided fashion (e.g., by one or more human users 205A-205N and/or 203A-203N).

The learning/training module 350 of the content organizing engine 332 may have access to and use one or more data models 356. For example, the data model(s) 356 may be built and updated by the training/learning module 350 based on the training data and feedback 360. The data model(s) 356 may be provided in any number of formats or forms. Non-limiting examples of the data model(s) 356 include Decision Trees, Support Vector Machines (SVMs), Nearest Neighbor, and/or Bayesian classifiers.

The training data and feedback 360 may train behaviors of components of the content organizing engine 332, and the training/learning module 350 may build the data model(s) 356, using machine learning. Natural language processing may be used in various embodiments to analyze information. For example, machine learning models can be trained to learn about user profiles (e.g., trained to associate certain types of data such as key words with a user in a user profile). The machine learning models can be trained to learn about users' core areas and their expertise and responsibilities. In some embodiments, the machine learning model can have access to various resources on a network, and may use the resources to build a chart of the user's skills, area(s) of expertise, roles, responsibilities, assigned action items, to-do lists, etc., for use in a user profile (e.g., an employee profile). Illustrative resources include different types of software programs and databases that may provide details of users' current tasks, such as Jira Software and Sibel. After learning about the user, the system determines which content (e.g., key words associated content) is relevant to the user. The system may also determine levels of relevance. Thus, system 300 may determine what types of content is relevant to which users based on a user's profile.

The learning/training module 350 may be configured to access information from content decision databases 370 for purposes of building the historical content database 372, which effectively stores historical information. Data within the historical content database 372 may constantly be updated, revised, edited, or deleted by the learning/training module 350 as the content organizing engine 332 processes more information received from communication server 328.

Information stored in historical content database 372 may include and is not limited to communication information, user information, organization information including historical organization information, processing information including historical processing information, key words, configurations, settings, variables, and properties. Further, information regarding the relevance of different types of content, as well as how to determine relevance (e.g., rules, settings, source(s) of content, rankings of content, location of key words/phrases, repetition of key words/phrases, definitions of relevance, etc.) may be stored in historical content database 372.

In some embodiments, the content organizing engine 332 may include multiple engines, such as the content organizer 348, the profile analyzer 352, and the information aggregator 364. In system 300, the content organizer 348 can transmit data to, and receive data from, the historical content database 372, the content decision database 370, the profile analyzer 352, the information aggregator 364, and the content decisions 320. The profile analyzer 352 can transmit data to, and receive data from, the profile database 354, the information aggregator 364, and the content organizer 348. The information aggregator 364 can transmit data to, and receive data from, the profile analyzer 352, the communication server 328, and the content organizer 348. Each of the content organizer 348, information aggregator 364, and the profile analyzer 352 can create and select appropriate processing decisions based on input from one or more components of the content organizing engine 332 and/or based on communication inputs received from the communication server 328.

The content organizer 348 may provide appropriate signaling to the communication server 328 and/or the information aggregator 364 that enables the content organizer 348 to receive information from the communication server 328 and/or the information aggregator 364. Further, if data from the communication devices (e.g., 204A-204N and/or 202A-202N) is not provided via the communication server 328 (in some aspects, via the information aggregator 364), the content organizer 348 may provide appropriate signaling to one or more of the communication devices (e.g., 204A-204N and/or 202A-202N) that enables the content organizer 348 to receive information from the communication device(s) (e.g., 204A-204N and/or 202A-202N).

The profile analyzer 352 may provide appropriate signaling to the profile database 354, the communication server 328 and/or the information aggregator 364 that enables the profile analyzer 352 to receive information from the profile database 354, the communication server 328 and/or the information aggregator 364. Further, if data from the communication devices (e.g., 204A-204N and/or 202A-202N) is not provided via the communication server 328 (in some aspects, via the information aggregator 364), the profile analyzer 352 and/or the information aggregator 364 may provide appropriate signaling to one or more of the communication devices (e.g., 204A-204N and/or 202A-202N) that enables the profile analyzer 352 to receive information from the communication device(s) (e.g., 204A-204N and/or 202A-202N).

Similar to the content organizer 348, the profile analyzer 352 may analyze information to determine what is relevant to profiles, to determine when new profiles should be created and what information relates to new profiles, to determine profile update recommendations, to confirm profile changes, etc. The profile analyzer 352 may perform these actions using previously identified profile information from the historical content database 372, the profile database 354, and/or the information aggregator 364, for example. In some embodiments, the profile analyzer 352 may process (e.g., scan or search) information for repeated words, specific key words, words that are identified as being related to one or more users or a group of users, words in certain locations, etc. and thereby build a user's profile. The profile analyzer 352 may manage the information in any manner, including by obtaining confirmation of actions from other elements in system 300 and/or from one or more users. User profiles can include a chart of the user skills, areas of expertise, assigned tasks, etc., to include information about areas of relevance that are related to the user. The profile analyzer 352 may provide information about user profiles (including information about profiles of groups to which a user is associated) to the profile database 354, and the profile analyzer may provide information to the content organizer 348.

The system 300 may confirm profile information, including relevancy of content, from one or more users. For example, in many instances, users receive communications containing information that is mostly related to the user (e.g., employees receive emails that are mostly related to their specific area of work). Also, a user will generally respond to communications containing information that is mostly related to the user (e.g., employees respond to emails that are mostly related to their relevant work). Thus, in some embodiments, a user (e.g., a sending user and/or a receiving user) can be prompted to confirm that specific content is relevant to one or more users (including themselves or other users), and this specific content can thereby be indicated as relevant to individual users (e.g. key words associated with the content can be added to a user profile associated with one or more employees). Key words (such as user name (including first name, last name, full name, and nickname), user title, etc.) can be used to determine relevance.

The information aggregator 364 may fetch (or be provided) information. In some aspects, the information aggregator 364 fetches information that is relevant to a user (including information relevant to a group having associated users). The information aggregator 364 can fetch information continuously or in a batched manner. Illustrative examples of information that from communication server 328. The information aggregator 364 can also fetch content that has been referenced within communications. Any of the information fetched may be used to increase the accuracy of profiles and to keep profile information updated, such as updates to roles and/or responsibilities. As discussed herein, information from the information aggregator 364 may be used by the content organizing engine 332, including being provided to the profile analyzer 352.

The communication server 328 may receive user information such as documents that define user roles/responsibilities or that otherwise correlate profile information to users. In some embodiments, a user may provide the information to the communication server 328 or to a component of the content organizing engine 332. The communication server 328 may provide profile information to the information aggregator 364. Thus, the communication server 328 may provide profile information to the profile analyzer 352. The profile analyzer 352 may update user profiles using any user profile information that is new within the profile information. The profile analyzer 352 may then send the updated user profile (and/or other profile information) to be saved in the profile database 354 for possible future use, and also provide any requested updated information to the content organizer 348 for use by content organizing engine 332. The information aggregator 364 may perform an analysis of the communication information using rules to process the data (e.g., perform comparisons with key words, such as user names). Based on the analysis, the information aggregator 364 may forward the information to the profile analyzer 352, as described herein.

In various embodiments, the information aggregator 364 may be a part of the content organizing engine 332. Further, the information aggregator 364 may be configured to use machine learning, similar to the content organizer 348 and the profile analyzer 352. The information aggregator 364 may share components (e.g., training data and feedback, data model(s), etc.) with one or more of the content organizer 348 and the profile analyzer 352.

The user interface plug-in 326 provides an interface to the user to be able to interact with content organization. The communication server 328 may receive information from, and provide information to, the user interface plug-in 326. In various embodiments, the content organizing engine 332 is responsible for processing the information provided to the user interface plug-in 326. The user interface plug-in 326 can provide interactive options for a user to manage content organization of communications; for example, the interface may display buttons that allow a user to select a desired organizational view of content. In various embodiments, the user interface plug-in 326 can appear when a communication is selected or opened by a user. For example, the interface may display a button labelled "Show Relevant." When the user clicks the button, only information relevant to the user would be shown within the content of the communication (e.g., the non-relevant information within the communication would be hidden). Other views of the content could be configured, such as highlighting different levels of relevance in different colors, or different types of relevance in different colors. In some aspects, the relevancies to be shown and hidden could be multi-level, and formatting could be altered to visually reflect a level of relevance or types of relevance. Thus, a user may have only one organizational view to select, or may select between multiple organizational views. The content organization options provided by the user interface plug-in 326 may be based on the content decisions 320 provided by the content organizing engine 332. The settings of the user interface plug-in 326 are entirely customizable and may be managed by one or more users, by automatic processing, and/or by artificial intelligence.

Using the information aggregator 364, the historical content database 372, and information from the profile analyzer 352, the content organizer 348 may be configured to manage organizational actions and save the organizational decisions as content decisions 320. The content organizer 348 may use rules to determine organization of content. The rules can be associated with various relevancies, thresholds, variables, levels of relevance, and other properties and settings. The content organization from the content organizer 348 may be coordinated, edited, or otherwise managed by other components in system 300, for example, the content organizing engine 332. The content decisions 320 may be provided as an output of the content organizing engine 332 to the user interface plug-in 326. In some embodiments, the content decisions 320 may include instructions for implementing and/or managing content organization, such as creating, displaying, updating, or editing content. As discussed herein, the organization may be different for specific users 203A-203N and 205A-205N or groups of users, and may be different for specific devices (e.g., one or more communication devices (e.g., 204A-204N and/or 202A-202N)), or the same for multiple devices, in various modalities.

For example, the content organizer 348 may receive information from the historical content database 372, the profile analyzer 352, and the communication server 328 (e.g., via the information aggregator 364). In various embodiments, the content organizer 348 may receive a notification of new information from the communication server 328 and apply the methods and systems described herein to the new content. The content organizer 348 may analyze the new content to determine whether the content should be organized, based on input from the profile analyzer 352, input from information aggregator 364 and/or input from historical content database 372. In some aspects, if the new content is to be delivered to (or has been delivered to) a user, then the content organizer 348 can check whether the user communication should be content organized (e.g., whether an input from the user is received). Based on the profile information provided by the profile analyzer 352, the content organizer 348 may compare content to the user profile (e.g., the user profile associated with the user selecting to organize the content) in order to determine which portions of the content are relevant to the user. If the content should be organized, then the content organizer 348 may assign relevancies to one or more portions of the content.

The content organizer 348 may also determine how to apportion the content; for example, which portions of content should be kept together, which portions of content have a same relevance, and where the content may be divided in order to move or change formatting of the content at that location. The content organizer 348 may, for example, divide the content into portions based on paragraphs, sentences, sections, types of content, etc. Thus, different portions of content may have different relevancies and different organizing actions (e.g., rearranging, changing formatting, showing, hiding, etc.). As another example, the content organizer 348 may determine that content contains key words (e.g., based on comparison of words within the content to a list of key words saved in historical content database 372) and that content organization should be implemented on the new content based on the key words. The content organizer 348 can apply the organizational actions to the content (e.g., configure the desired organizational views) and provides the organization decisions (e.g., the data corresponding to the organizational views) to the content decisions 320.

When the content organizing engine 332, or components thereof, searches for information, the content organizing engine 332 may perform a one-time search, multiple one-time searches, and/or continuous monitoring. During monitoring, the content organizing engine 332 may process incoming information (e.g., communications, documents, calendar information, etc.) as it is received. The information can be managed (e.g., scanned, searched, parsed, and/or analyzed (including performing semantic and/or syntactic analysis)). For example, the information may be compared to one or more key words and/or thresholds based on rules and/or settings. During the processing, data including results of the analysis may be stored for future use.

The thresholds to which data is compared may take any form. Thresholds may be set based on various criteria, and multiple thresholds may be set with different types of content organization performed at various thresholds, or a same content organization performed at various thresholds. For example, a first threshold may be set to display a first content organization after receiving a communication mentioning a set of key words. A second threshold may be set to display a second content organization for any mention of a different set of key words within the communication. The first content organization may apply visual differences (e.g., different highlighting, different colors, different font types, etc.) to the content within the communication and the second content organization may filter the content within the communication to show less content (e.g., only relevant or content having a certain relevance) within the communication. In some embodiments, in the second content organization, any links that are included in the content may be determined to be relevant, or not, and may be displayed as a hyperlink or a URL in the second content organization only if they are relevant. For any content organization, a user may have a setting that is selectable by the user that causes a certain content organization to be selected and shown. Thresholds may be pre-set (e.g., previously configured, pre-determined, or determined before the content organizer methods are applied to new content), and may change based on any criteria. For example, the rules and thresholds may be set by a user, automatically, and/or by artificial intelligence before a communication to which content is to be applied is received. In addition, thresholds may be set automatically and changed automatically (for example based on other thresholds), by artificial intelligence, and/or they may be defined by a user.

To enhance capabilities of the content organizing engine 332, the content organizing engine 332 may constantly be provided with updated training data and feedback 360. The training data may be communication inputs in the form of communication information, including real-time communication data from users 203A-203N and 205A-205N. It is possible to train the content organizing engine 332 to have a particular output or multiple outputs. In various embodiments, the content organizing engine 332 is trained using content organization decisions received from the users in real-time.

Figure 4:
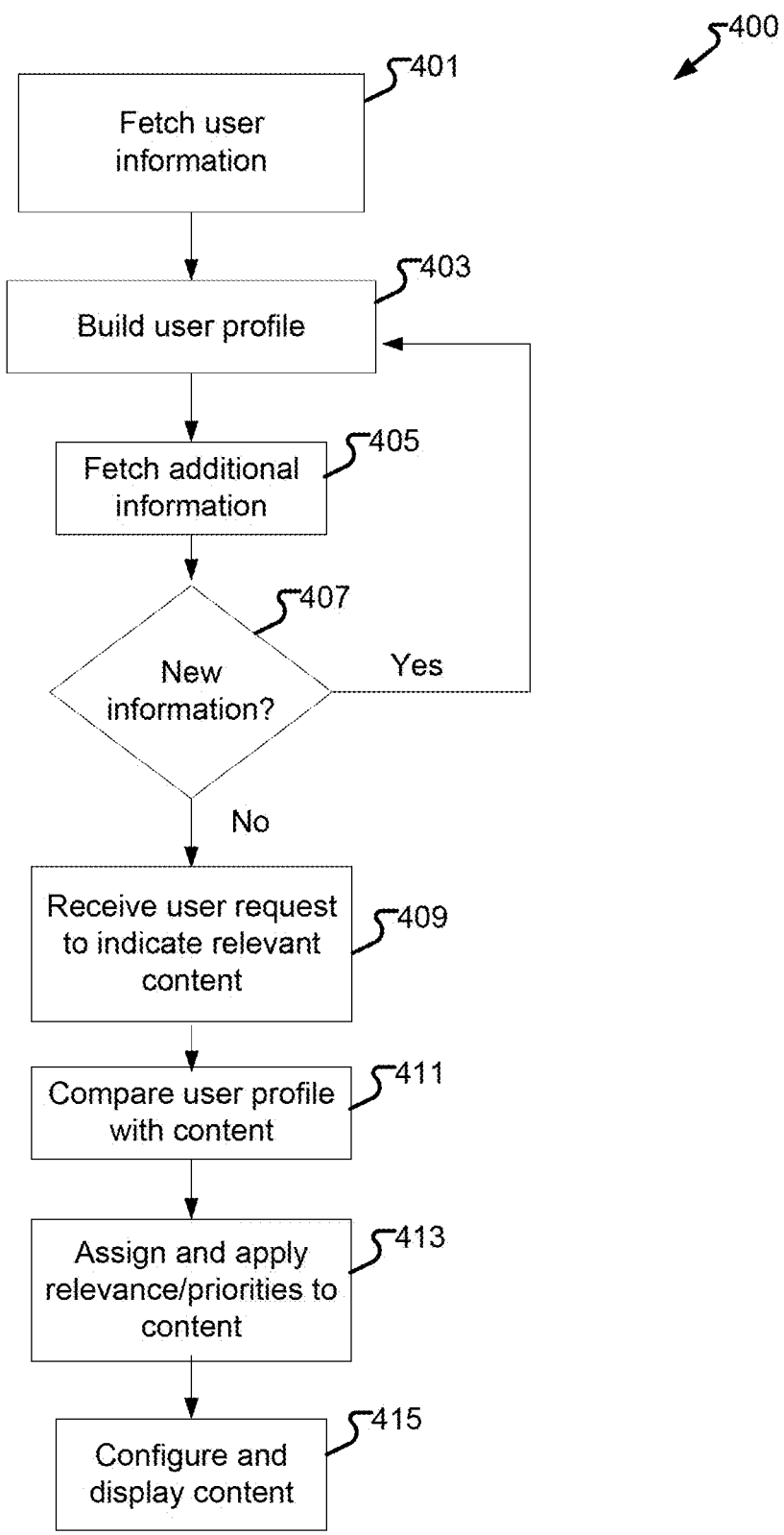
FIG. 4 is a flow diagram illustrating a first method in accordance with at least some embodiments of the present disclosure.

In FIG. 4, a flow diagram illustrating a first method in accordance with at least some embodiments of the present disclosure is shown. The method begins when user information is fetched at step 401. In particular, the profile analyzer may fetch information relevant to a user's profile from the information aggregator 364. For example, the profile database 354, the profile analyzer 352, and/or the content organizer 348 may be provided with information relevant to a user's profile from the historical content database 372 via the content organizer 348. As an illustrative example, the user may be an employee that uses one or more products to collaborate and also for workflow management (including task tracking). The products that the employee uses include email, messaging systems, work management databases, and ticketing systems. This information may be made available to the profile analyzer 352 from one or more of the historical content database 372, the content organizer 348, and the communication server 328 via the information aggregator 364. The profile analyzer 352 may use machine learning and natural language processing to analyze the information and determine what information should be included in the user's profile. At step 403, a user profile is built.

In particular, at step 403, the profile analyzer 352 searches the information for words that are related to the user in order to build the user's profile. The profile analyzer 352 manages the information, for example, by extracting and organizing the information into a set of profile information for a user, for example into one or more charts of the user's skills, areas of expertise, and assigned tasks, which is saved to the profile database 354 as the user profile.

Additional information is fetched at step 405. The additional information may be one or more new communications that are received from the communication server 328 via the information aggregator 364. For example, if additional information is received at the information aggregator 364 that relates to the user's profile (e.g., updated employee responsibilities related to task tracking), then the additional information is fetched by the profile analyzer 352 (e.g., provided to the profile analyzer 352). In other embodiments, the additional information may be information that was referenced in information that was previously received (e.g., information attached, such as information attached as a separate file or hyperlink). At step 407, the profile analyzer 352 determines if the additional information is new information and/or whether it should be saved to a user profile. If it is determined that the additional information is new information, then the method proceeds back to step 403 to update/build the user profile. If there is no new information, then the method proceeds to step 409. Once the profile of a user has been built, the content of a communication can be organized based on the user profile.

At step 409, a user requests to indicate relevant content. The user may execute the request by selecting a button on a user interface plug-in 326 while content is being viewed, where the button selects a desired level of relevance to show within the content. Upon receiving the user's request to indicate relevant content, the content may be analyzed by the content organizer 348. To determine the content organization, the content organizer 348 may scan or otherwise process the content of the communication to determine different portions of the content within the communication. This may happen before, during, or after any relevance of the content is determined. To determine relevance of the content (or one or more portions of the content) information from the user profile may be compared with the content at step 411. The content organizer 348 may also access and analyze information that is linked within the communication. The content organizer 348 may extract relevant information to duplicate within the communication (e.g., tasks and/or action items may be listed at a top portion of the communication) or to add new content to the communication.

As one illustrative example, a communication may be a message that contains a list of items from a ticketing system such as Jira Software, and the system (upon receiving a request to indicate relevant content for the communication) may pull data from Jira Software for analysis. Thus, if the message contains a request to update the status of various tickets (e.g., a list of items) that are each applicable to one or more different team members, but that were sent in a single communication, then the system can access all the tickets for the team members (e.g., access the information for each ticket). Each ticket may include information such as the name of a user who created the ticket, a priority of the ticket, and name(s) of one or more users assigned responsibility for the ticket. The system may compare this information with the communication and with the organization rules (e.g., a user's identifying information who is a recipient of the communication, a user's identifying information who selected to indicate relevant content for the communication, etc.) to determine a relevance for the tickets. In various embodiments, different levels of relevance may be determined for different content (e.g., different tickets). In various embodiments, tickets that are relevant to the user may be indicated as relevant and/or tickets that are not relevant to the user may be indicated as not relevant.

Based on the comparison of the user profile with the content in step 411, relevance may be assigned to portions of the content within the communication, and the desired organizing may be applied to the content at step 413. If there are different levels of relevance determined for different content within the communication, then the organization may be processed based on the different levels of relevance. For example, in some aspects, highlighted portions can be in different colors of highlighting to signify different categories like informational, action, reference, approval, assistance, etc.

At step 415, the content is configured and displayed. In some aspects, using the methods and systems disclosed herein, a user may select to configure a desired view relevant content within a communication (e.g., when a message is opened, the message may include a button labelled "Show Relevant" and the user may select the button in order to show only relevant segments of content within the message). Thus, the content of the communication may be organized and displayed according to user preference. The user preference may be a preference of a viewing user, or may be set based on other factors such as predefined settings, administrator settings, etc.

In some aspects, the methods and systems described herein may be applied to email clients, instant messaging clients, and other types of messaging clients. The methods and systems described herein can also be applied to other types of information, such as events, documents, etc. As one example, if a help file is generated and made available for review by multiple users, each user may need to review only a portion of the document, and different users may need to review different portions. As described herein, each user may select to show relevant content, and the content of the help file (or portions thereof) may be reorganized, hidden, and/or formatted in accordance with a user's desired content organization in order for the user to view the relevant content of the help file as it applies to that user. The user interface plug-in 326 may show options (e.g., a "Show Relevant" button) to a user for a user to be able to organize the information based on relevance, including being able to organize different types of information, such as documents and webpages.

Figure 5:
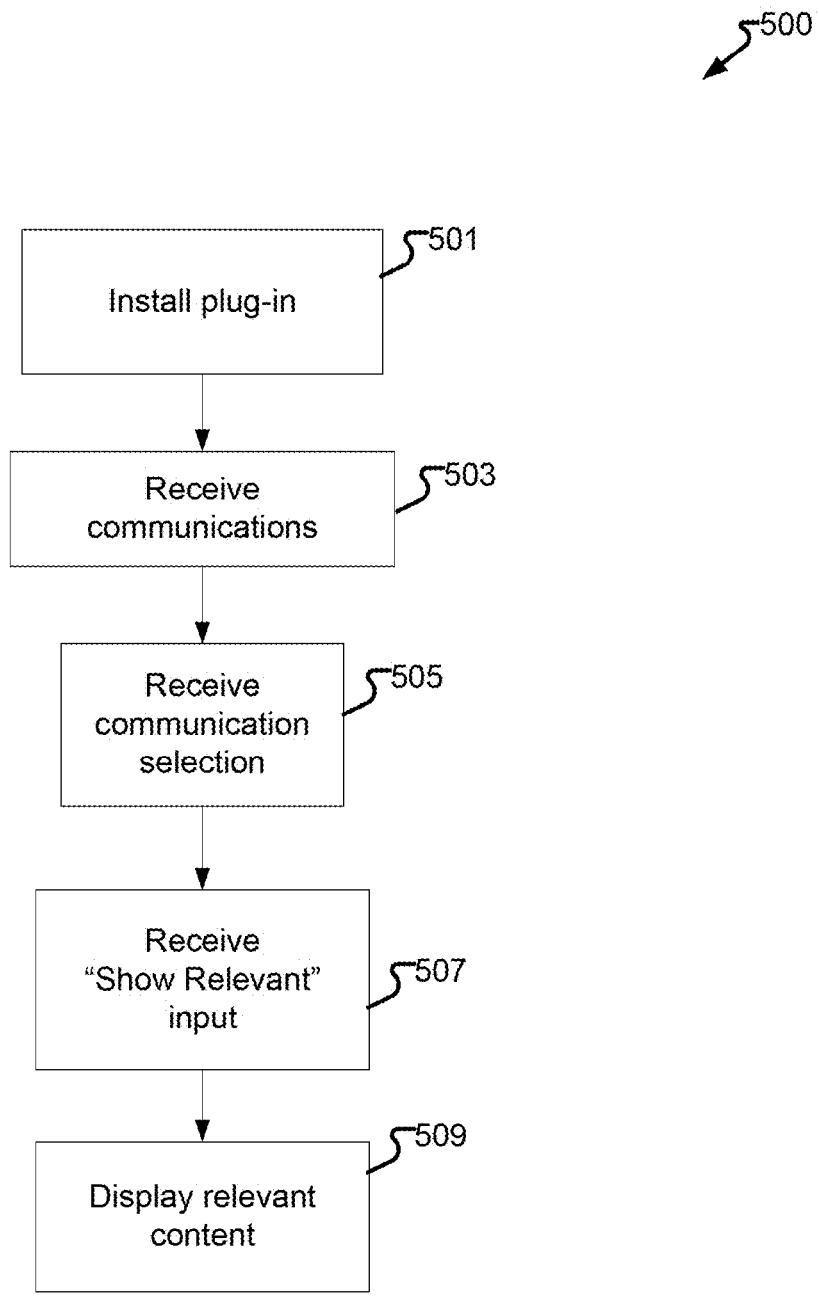
FIG. 5 is a flow diagram illustrating a second method in accordance with at least some embodiments of the present disclosure.

Referring now to FIG. 5, a flow diagram illustrating a second method in accordance with at least some embodiments of the present disclosure is shown. The method begins when a user interface plug-in is installed at step 501. The plug-in, upon being installed, may cause options available to a user viewing a communication to change so that the user has options to view relevant content. In addition, the user may be presented with additional options, such as viewing different levels of relevant information within a communication, viewing different formatting of the information, and hiding different amounts of information (e.g., levels of relevance, types of content, etc.). These options may be in the form of selectable buttons, a drop-down menu, or other interactive options.

At step 503, communications are received. For example, if a user is viewing email communications, incoming emails may be received and displayed for the user's selection. At step 505, a communication selection is received. Continuing with the email example, the user may select one of the emails to view. The email that the user selects may be lengthy because it is a communication about a team meeting that contains multiple discussion points, or items. Because the plug-in was installed, the user also has options for organizing the content, such as a button to show relevant content, labeled "Show Relevant." In some aspects, a user can select a default view to show a desired default view of content organization. When information is selected (e.g., when an email is viewed, when a document is opened, when a webpage is selected, etc.), the default view can be a default menu or button option that is displayed for a user to select, or the user can initially view a default view of the organized (e.g., summarized) content of the communication.

At step 507, a "Show Relevant" input is received. For example, the user viewing the selected content (e.g. an email) may have decided that the email contains content that would be useful to have organized according to relevance. The user may decide to have the content organized according to relevance due to a length of the content (e.g., an email spanning five pages would be time consuming to read and to process all of the information within the email). Thus, after selecting the "Show Relevant" content button, at step 509, relevant content is displayed. In various aspects, only relevant content within the email may be shown, with the content that is not relevant being hidden. As an illustrative example, if there are sixteen items of content within the five page email, and only two items of the content are relevant to the user, then only the two relevant items may be shown with the other fourteen items of content being hidden. As discussed herein, the relevant content may be formatted, hidden, and/or reorganized in a manner determined by the user (or determined by the system, an administrator, etc.).

As a further illustrative example, methods and systems described herein can be applicable to communications that require updates from team members. For example, if a manager sends an email to all his team members that requests a status for all items on a list of Jira Software items (where the list of items contains links to each Jira Software item), then each team member would need to access and check each link to confirm whether they were responsible for the content associated with the link and, if they are responsible, then verify the status. This could be time consuming, cumbersome (e.g., if each team member has to click on every link and review the data at the link, then also track which links have been viewed and/or reviewed and also look up associated statuses), and error prone (e.g., due to looking up multiple pieces of information). However, in embodiments described herein, each team member may advantageously be able to view the email and select an option to "Show Relevant" in order to show the relevant content. After a team member selects the option to show the relevant content, then the content of the email would be changed so that the email content would show only the Jira Software items (e.g., links) that are relevant to the team member. As described herein, the system may use a profile of the team member to compare the content of the email in order to determine relevant content. The links in the email would be accessed by the system and analyzed for relevant content (e.g., by comparing the content with information from the team member's profile) in order to display the relevant content to the team member. Thus, the team member can quickly and easily view an accurate display of relevant content using the embodiments described herein.

Various embodiments may be useful for teams that receive team communications. As another illustrative example, an email discussion may involve users working on different components of a project. However, the discussion may be regarding a new feature of the project and the discussion involves many details. Thus, when one of the users views the email, the user can get a quick view of the portions of the email that are relevant to him or her based on the user's profile (e.g., using the user profile that contains details of what portions of the project are relevant to the user). The user can quickly choose content to show or hide based on the system's determination of the levels of relevance of content within a communication based on the user profile, and the user can advantageously have options for different views of the relevant content. In various embodiments, the user may view only the relevant actions in the communication (with irrelevant information being hidden), or the user may switch to view all relevant information (with irrelevant information being hidden) where the content is formatted differently depending on its category (e.g., whether the content is an action content, an informational content, an approval content, or a hold content).

Figure 6:
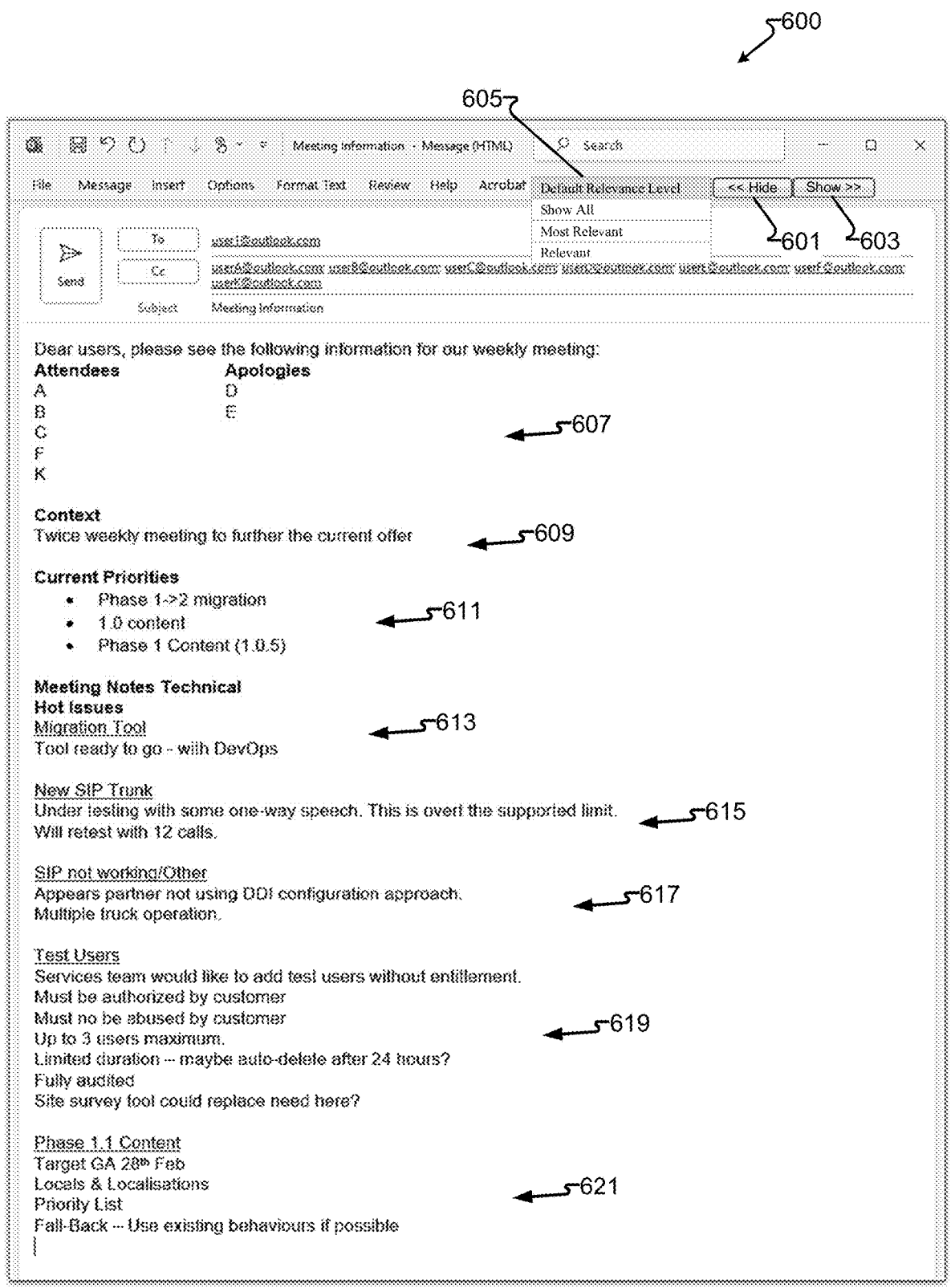
FIG. 6 is an illustrative screenshot showing a first content layout option in accordance with at least some embodiments of the present disclosure.

FIG. 6 is an illustrative screenshot showing a first content layout option in accordance with at least some embodiments of the present disclosure. In FIG. 6, a communication has been received and a user is viewing the communication (e.g., the screenshot 600). The communication is regarding a meeting attendance and the meeting topics.

Attendance at the meeting is show as "Attendees" and "Apologies" 607. Attendees are users A, B, C, F, and K, and Apologies are users D and E. The communication also shows the "Context" 609 of the meeting, which is a description of the meeting, the "Current Priorities" 611 of the meeting, the "Meeting Notes Technical" and "Hot Issues" that include "Migration Tool" 613, the "New SIP Trunk" 615, the "SIP not working/Other" 617, the "Test Users" 619, and "Phase 1.1 Content" 621.

The communication 600 shows user interface options as buttons for organizing the content of the communication, in accordance with various embodiments disclosed herein. For example, a drop-down list of selectable relevance levels is shown at element 605, with the options of the drop-down list being "Default Relevance Level," "Show All," "Most Relevant," and "Relevant." In various embodiments, the different options of the drop-down menu are selectable by the user and each correspond to a different content organization. In other words, the information can be categorized into various levels (e.g., be multi-level) based on the relevance to the user. Thus, when the user chooses to show/hide the message, the user can select different levels.

For example, "Show All" option may show all content of the communication (e.g., as originally sent to the user with no content organization applied. "Default Relevance Level" may be automatically applied as the default view and may show a selected default level of content. "Most Relevant" and "Relevant" may each show a different level of content according to relevancy. For example, other buttons in the communication may include "Hide" and "Show" buttons. By clicking on "Hide" and "Show," a user may toggle through different levels of content as desired (e.g., the user may toggle through the options of "Default Relevance Level," "Show All," "Most Relevant," and "Relevant").

Figure 7:
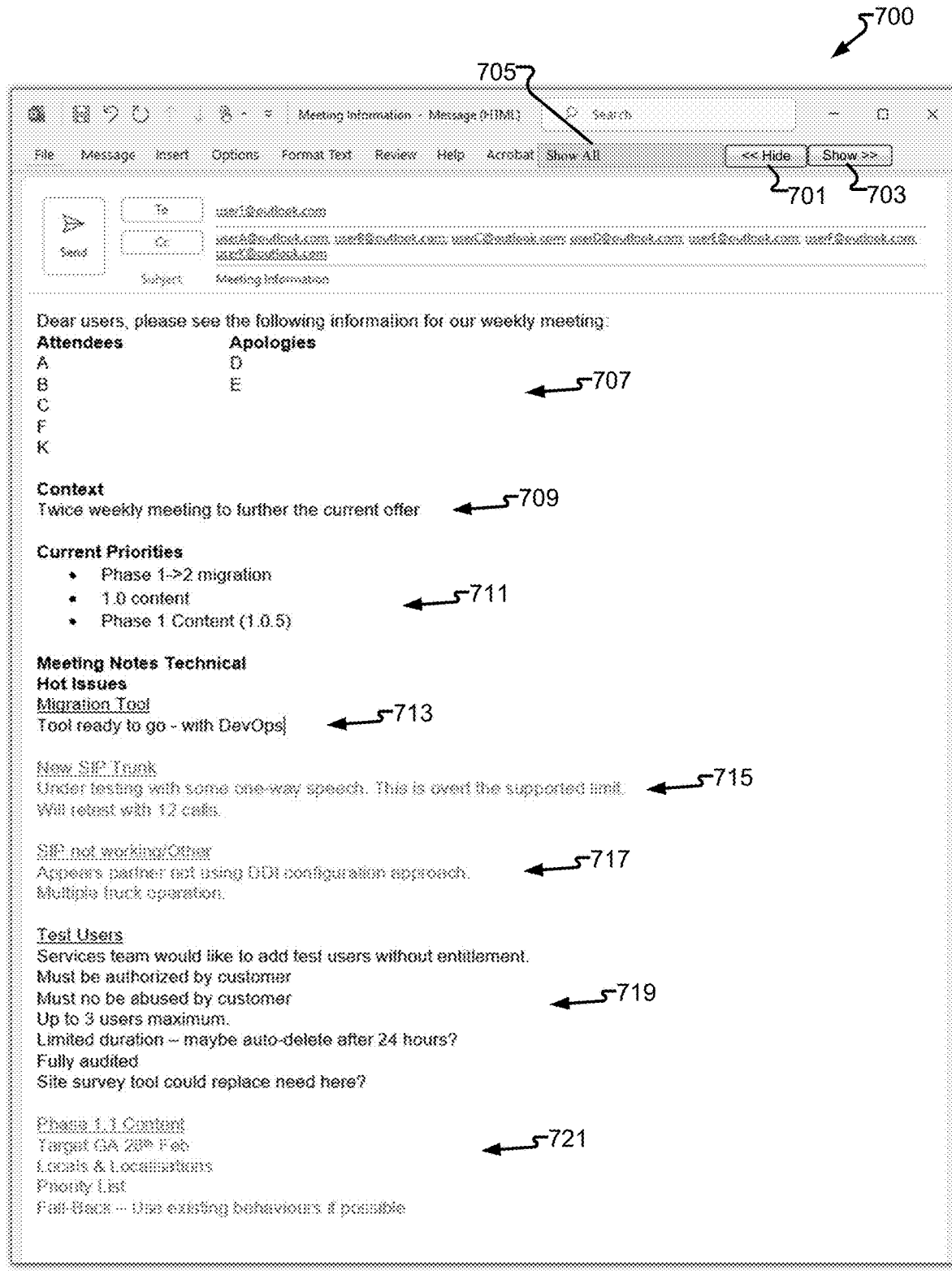
FIG. 7 is an illustrative screenshot showing a second content layout option in accordance with at least some embodiments of the present disclosure.

FIG. 7 is an illustrative screenshot showing a second content layout option in accordance with at least some embodiments of the present disclosure. In various embodiments, the communication 700 shown in FIG. 7 may correspond with like elements shown in FIG. 6. In FIG. 7, a user has selected a level of information of "Show All" from drop down list 705. The user may have selected "Show All" by clicking on the drop-down list 705 and selecting a desired level, or in some embodiments, the user may have used buttons "Hide" 701 and "Show" 703 to toggle through different levels and thereby select the level "Show All."

In FIG. 7, the level of "Show All" has been configured to show all of the content in the communication 700, but to differentiate between different levels of content using different colors of font with an orange color of font indicating a highest relevant level of content and a blue level of font indicating a highly (but not the highest) relevant level of content. The "Phase 1.1 Content" 721 of the communication 700 is determined to be the highest relevant level of content, and is thus shown in an orange font. The "New SIP Trunk" 715 and "SIP not working/Other" 717 are determined to be a high level of relevance, and are therefore shown in a blue font. The remaining content is shown in black font ("Attendees" and "Apologies" 707), "Context" 709, "Current Priorities" 711 including "Meeting Notes Technical" and "Hot Issues" that include "Migration Tool" 713, and "Test Users" 719. Thus, advantageously, the user is able to quickly and easily view differences in the content that show differing relevance of various portions of the content (e.g., by viewing different colors of font).

Figure 8:
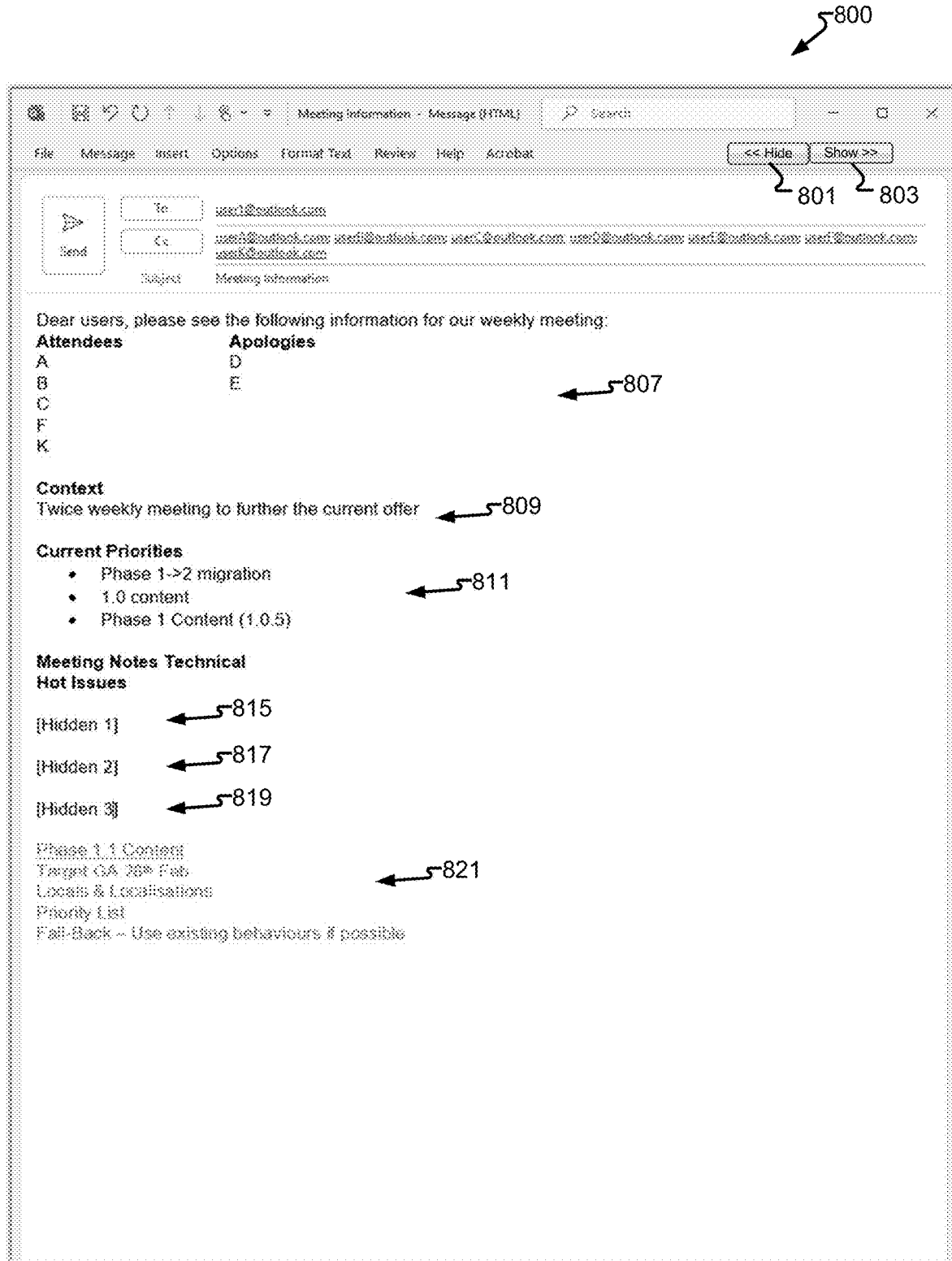
FIG. 8 is an illustrative screenshot showing a third content layout option in accordance with at least some embodiments of the present disclosure.

FIG. 8 is an illustrative screenshot showing a third content layout option in accordance with at least some embodiments of the present disclosure. In various embodiments, the communication 800 shown in FIG. 8 may correspond with like elements shown in FIGS. 6 and 7. In FIG. 8, the communication 800 has a "Hide" button 801 and "Show" button 803, and in this embodiment, there is no drop-down menu option. As a user selects the "Hide" button 801, the content of the communication 800 can be reduced to show more and more relevant content. Thus, the relevance of the content may be multi-level with different levels of relevance. There can be any number of options for different levels of content to show. The levels of content, as they are each selected, may show different views of the communication 800 with more or less levels of relevant content in each view. In the illustrative embodiment shown in FIG. 8, a user has selected the "Hide" button until a desired level of content is shown.

In some aspects, there could be a five point scale "1 to 5," with "1" being the most important and "5" being the least important. If the user chooses level "1" then only the most important pieces of content could be shown, with all other content being hidden. For example, there could be irrelevant content that is hidden, and also all content considered relevant but at an importance level of "2" through "5" would also be hidden. Alternatively, all content could be assigned levels with the irrelevant content being assigned to level "5." Thus, if a user chooses level "3," then the user could be shown the information that is relevant to the user and includes levels "1," "2," and "3." Or, alternatively, the user could select level "5" and all of the content within the communication would be shown to the user.

In various aspects, the user interface could include buttons that, when selected by the user, would switch between levels in the message. Thus, a user could select a button to move from level "5" to level "4," and a next click of the button would take the user to level "3" and so on, or vice-versa.

In the communication 800, the user has selected between the "Hide" and "Show" buttons to show only content that is relevant to the user and to change the font color of important information to orange. In particular, the system has determined that the attendance, the context of the meeting, the current priorities, and the phase 1.1 content are relevant to the user based on comparison of words within the content of the communication to a profile for the user. Thus, when the user selects to show only content that is relevant to the user, attendance at the meeting is shown as "Attendees" and "Apologies" 807, the "Context" 809 of the meeting is shown, "Current Priorities" 811 of the meeting are shown, and "Phase 1.1 Content" 821 is shown. Further, the system determines that the "Phase 1.1 Content" 821 is important, so the color of the font for the "Phase 1.1 Content" is changed to orange. In addition, the content that the system has determined to be not relevant to the user is hidden, as shown at element 831.

Figure 9:
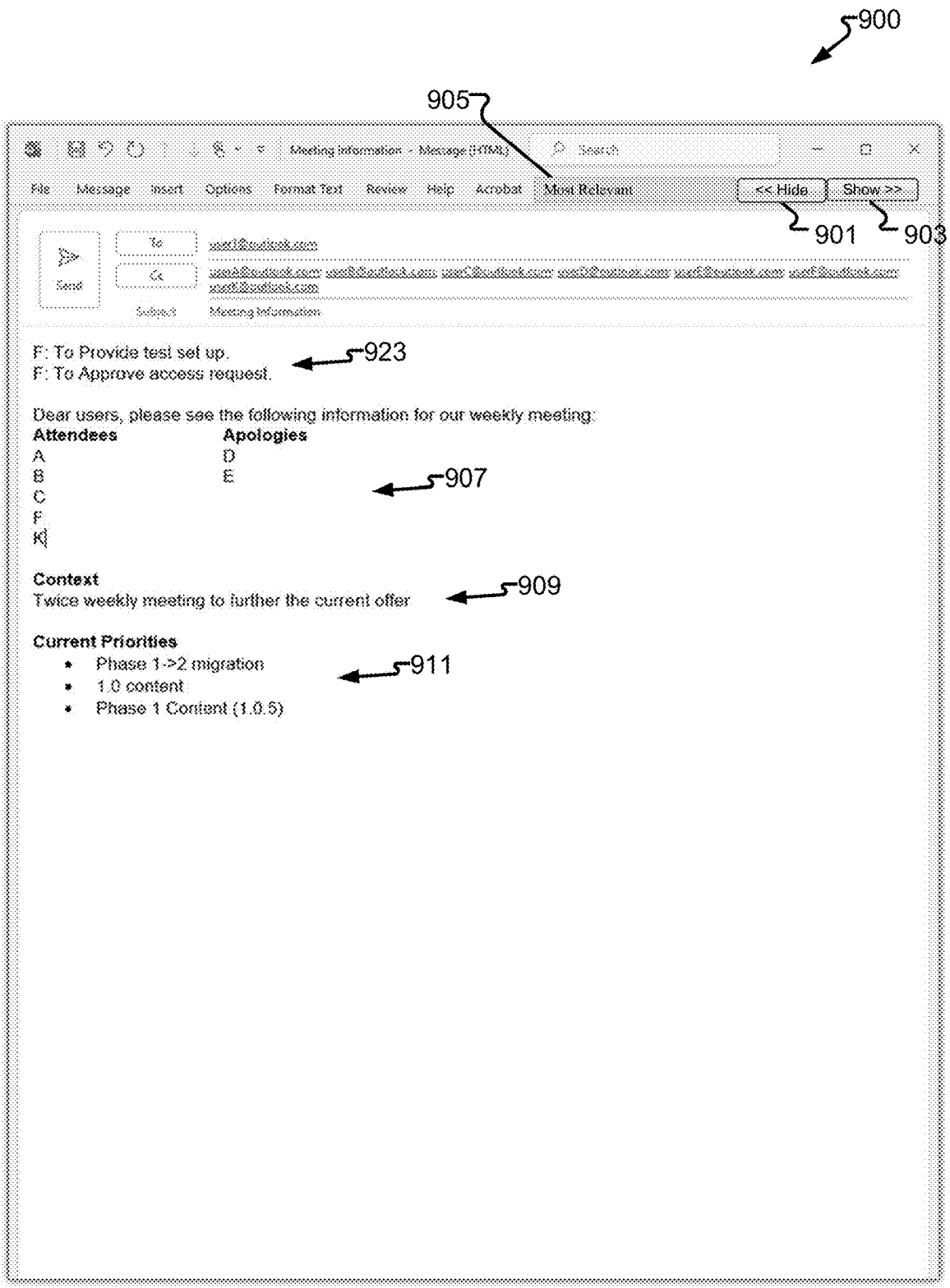
FIG. 9 is an illustrative screenshot showing a fourth content layout option in accordance with at least some embodiments of the present disclosure.

FIG. 9 is an illustrative screenshot showing a fourth content layout option in accordance with at least some embodiments of the present disclosure. In various embodiments, the communication 900 shown in FIG. 9 may correspond with like elements shown in FIGS. 6, 7, and 8. In FIG. 9, the communication 900 has a drop-down menu 905, as well as a "Hide" button 901 and "Show" button 903, similar to FIGS. 6-8. In FIG. 9, the user (in this case, user F) has selected a view of "Most Relevant" 905 from the drop down menu of the plug-in interface. In various embodiments, the user can select "Most Relevant" 905 by selecting the drop-down menu and choosing the desired option, or the user may click between the "Hide" button 901 and the "Show" button 903, and these may toggle between the drop-down menu items. In other embodiments, the menu items may select different levels (or types) of content to show (or different formatting) than the "Show" and "Hide" buttons.

The system has determined that the "Most Relevant" information includes "Attendees" and "Apologies" 907, the "Context" 909 of the meeting, and the "Current Priorities" 911 of the meeting. In addition, the system has determined based on a user profile for user F that certain items of the communication are relevant and important to user F and should be shown grouped together at the top of the communication 900. For example, upon receiving a selection from user F to show the content organization of "Most Relevant," the content of communication 900 was compared with information from the user profile of user F. Based on the comparisons of the content of the communication with the user profile, the communication layout shown in FIG. 9 was configured and displayed. For example, user F could have rules in place for a "Most Relevant" view that requires the system to place any items of content that require attention by user F at a top of the communication (and to hide content that is not relevant). Thus, the view shows a list of two items 923 at the top of communication 900, where the two items require the attention of user F (e.g., "To Provide test set up" and "To Approve access request"). In further embodiments, other information could be grouped together within, or added to, the organized content, such as items that have actionable due dates, items that are informational, items that require approval, and/or items that require assistance from another user.

Thus, as shown in FIGS. 6-9, the user may thereby customize and configure different levels of content to show/hide, reorganize, and/or format based on relevance, including different configurations corresponding to different levels. Further, in certain aspects, a user can switch between the embodiments shown in FIG. 6, FIG. 7, FIG. 8, and FIG. 9.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of managing communications, the method comprising:
   building, by a processor using artificial intelligence, a user profile based on data electronically stored, the data electronically stored including relevant information including roles and responsibilities associated with a user;
   receiving, by the processor, a first communication;
   obtaining, by the processor, the user profile;
   comparing, by the processor, a user property associated with the relevant information from the user profile with a first content and a second content in the first communication;
   determining, by the processor, a first relevancy of the first content and a second relevancy of the second content;
   configuring, by the processor, a first content layout of the first communication based on the first relevancy and the second relevancy;
   displaying the first content layout; and
   retrieving, by the processor, action items related to the roles and responsibilities from the user profile to be included in the first content layout,
   wherein the action items were not originally included in the first communication.

2. The method of claim 1, wherein the first relevancy is relevant to the user profile, wherein the second relevancy is not relevant to the user profile, and wherein the first content layout displays the first content and does not display the second content based on the first relevancy and the second relevancy.

3. The method of claim 1, wherein the first relevancy is relevant to the user profile, wherein the second relevancy is not relevant to the user profile, and wherein the first content layout highlights the first content and does not highlight the second content based on the first relevancy and the second relevancy.

4. The method of claim 1, further comprising:
   receiving, after the obtaining the user profile, a new user information; and
   updating the user profile to comprise an updated user property based on the new user information.

5. The method of claim 4, wherein the comparing the user property from the user profile with the first content and the second content comprises comparing the updated user property with the first content and the second content.

6. The method of claim 1, wherein the user profile is based on information comprising a user skill and a user group, wherein the information is obtained from a work management database.

7. The method of claim 6, wherein a machine learning process updates the user profile based on the second content.

8. The method of claim 1, further comprising:
   determining a first priority of a third content in the first communication and a second priority of a fourth content in the first communication, wherein the configuration of the first content layout is based on the first priority and the second priority.

9. The method of claim 8, wherein an order of the third content and the fourth content in the first content layout is based on a priority difference in the first priority and the second priority.

10. The method of claim 8, wherein the first priority and the second priority are based on at least one of a paragraph content and a sentence content within the first communication.

11. The method of claim 1, further comprising:
    receiving, after receiving the first communication, a second communication;
    comparing the user property with a third content and a fourth content in the second communication;
    determining a third relevancy of the third content and a fourth relevancy of the fourth content;
    configuring a second content layout of the second communication based on the third relevancy and the fourth relevancy; and
    displaying the second content layout.

12. The method of claim 1, wherein the first content layout displays a layout of information in the first communication in multiple levels, and wherein at least some of the information is indicated as relevant based on one or more levels of the multiple levels.

13. The method of claim 12, wherein the multiple levels indicate the first relevancy and the second relevancy, and wherein at least one level of the multiple levels is hidden.

14. The method of claim 1, wherein a machine learning process determines the first relevancy and the second relevancy.

15. A communication system, comprising:
    a processor; and
    computer memory storing data thereon that enables the processor to:
    build, using artificial intelligence, a user profile based on data electronically stored, the data electronically stored including relevant information including roles and responsibilities associated with a user;
    receive a first communication;
    obtain the user profile;
    compare a user property associated with the relevant information from the user profile with a first content and a second content in the first communication;
    determine a first relevancy of the first content and a second relevancy of the second content;
    configure a first content layout of the first communication based on the first relevancy and the second relevancy;

display the first content layout; and
retrieve action items related to the roles and responsibilities from the user profile to be included in the first content layout,
wherein the action items were not originally included in the first communication.

16. The communication system of claim 15, wherein the processor is further enabled to receive multiple communications comprising the first communication, to determine a set of communications from the multiple communications for analysis, to analyze the set of communications to configure a second content layout of the first communication, and to display the second content layout.

17. The communication system of claim 16, wherein a machine learning process determines the set of communications and analyzes the set of communications.

18. The communication system of claim 15, wherein the first communication is a document accessible by group members, and wherein a user associated with the user profile is one of the group members.

19. The communication system of claim 15, wherein the first communication comprises links to tasks assigned to group members, wherein a user associated with the user profile is one of the group members, wherein the tasks comprise a first task assigned to the user and a second task not assigned to the user, wherein the first relevancy is based on the first task being assigned to the user and the second relevancy is based on the second task being not assigned to the user, and wherein the first content layout is based on a difference between the first relevancy and the second relevancy.

20. A system, comprising:
a server comprising a processor and a message routing engine that is executable by the processor and that enables the processor to:
build, using artificial intelligence, a user profile based on data electronically stored, the data electronically stored including relevant information including roles and responsibilities associated with a user;
receive a first communication;
obtain the user profile;
compare a user property associated with the relevant information from the user profile with a first content and a second content in the first communication;
determine a first relevancy of the first content and a second relevancy of the second content;
configure a first content layout of the first communication based on the first relevancy and the second relevancy;
display the first content layout; and
retrieve action items related to the roles and responsibilities from the user profile to be included in the first content layout,
wherein the action items were not originally included in the first communication.

\* \* \* \* \*